United States Patent [19]
Firoozmand

[11] Patent Number: 5,247,626
[45] Date of Patent: Sep. 21, 1993

[54] FDDI CONTROLLER HAVING FLEXIBLE BUFFER MANAGEMENT

[75] Inventor: Farzin Firoozmand, Cupertino, Calif.

[73] Assignee: Advanced Micro Devices, Inc., Sunnyvale, Calif.

[21] Appl. No.: 529,364

[22] Filed: May 29, 1990

[51] Int. Cl.$^5$ .................. G06F 13/00; H04L 12/00
[52] U.S. Cl. ...................... 395/250; 395/200;
 370/85.1; 364/DIG. 1; 364/239; 364/239.1;
 364/264.5; 364/222.2; 364/242.94
[58] Field of Search ............... 395/250, 200; 370/85.1

[56] References Cited

U.S. PATENT DOCUMENTS

| | | | |
|---|---|---|---|
| 4,914,652 | 4/1990 | Nguyen | 370/85.5 |
| 4,951,280 | 8/1990 | McCool et al. | 370/85.12 |
| 4,958,342 | 9/1990 | Williams et al. | 370/79 |
| 5,016,221 | 5/1991 | Hamstra | 365/221 |
| 5,058,156 | 10/1991 | Dietze | 380/9 |

Primary Examiner—Eddie P. Chan
Attorney, Agent, or Firm—Lowe, Price, LeBlanc & Becker

[57] ABSTRACT

A network interface interconnects a processor and a memory residing on a system bus having a predetermined average bus latency to a network containing other processors and memories. The interface, which is implemented using a bus master architecture, includes a network access controller for accessing data on the network, a random access memory, preferably in the form of an SRAM as a buffer between the network and system bus, and a network DMA controller. The Network Access Controller configures the buffer to have at least one logical FIFO for storing data; the size of the logical FIFO is related to the predetermined average bus latency. The DMA controller further controls transfer of data between the system memory and the network through the logical FIFOs. Preferably, the buffer is configured to have (1) a first logical FIFO for storing incoming data from the network and (2) at least one additional logical FIFO for storing outgoing data from said system memory to the network. Frames of data in the buffer are demarked by tag and status bits. The interface has particular utility in an FDDI type local area network.

46 Claims, 15 Drawing Sheets

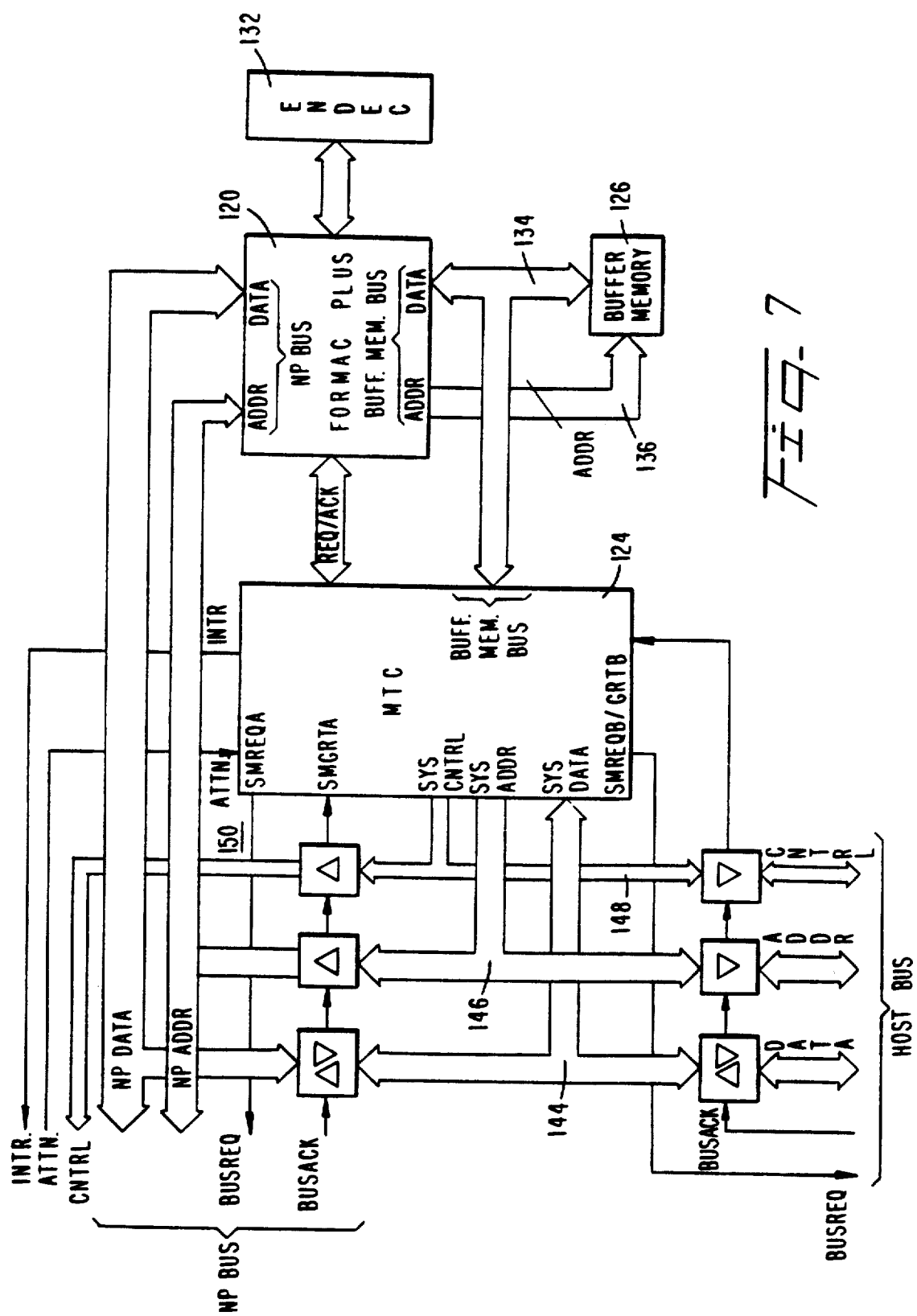

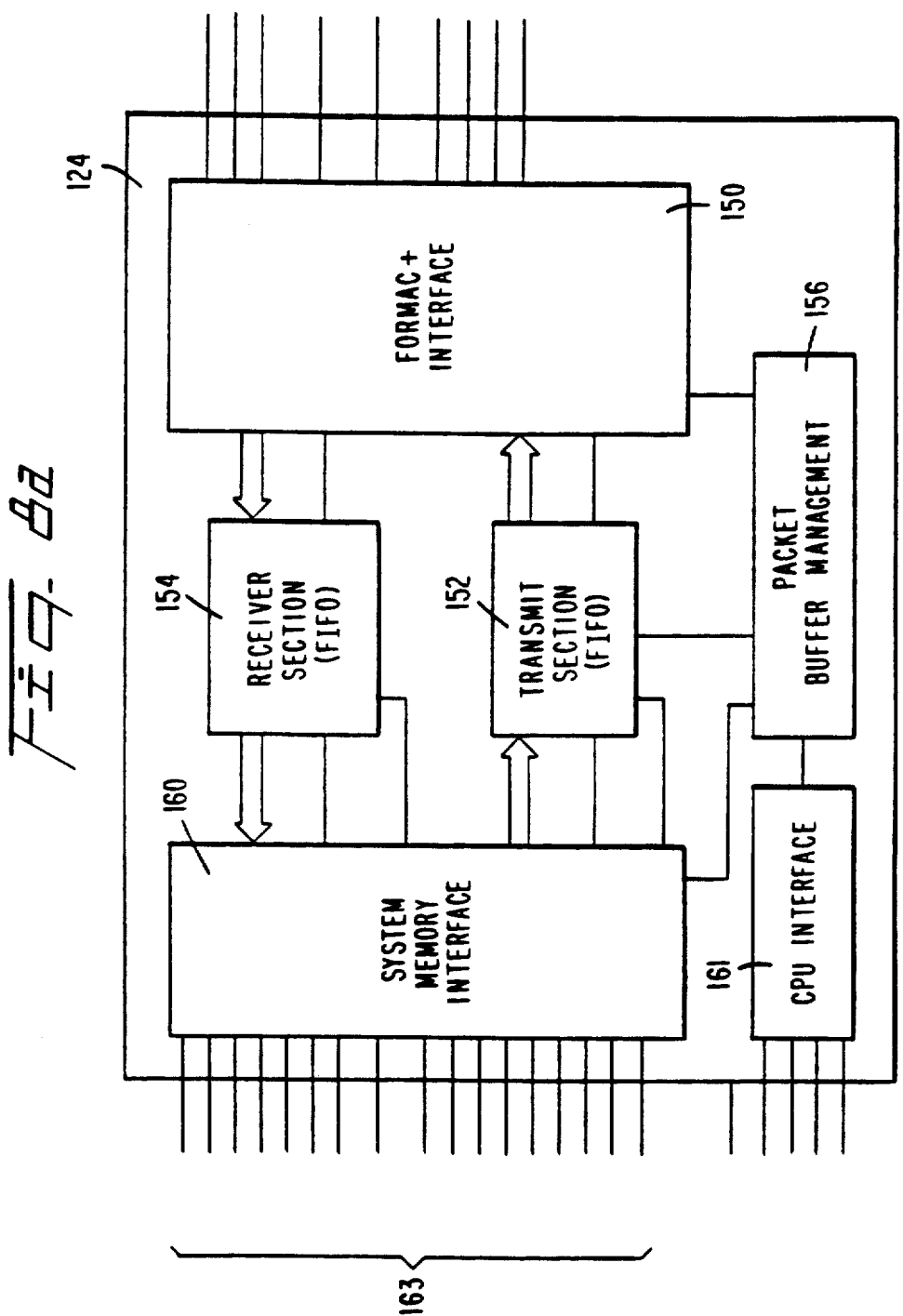

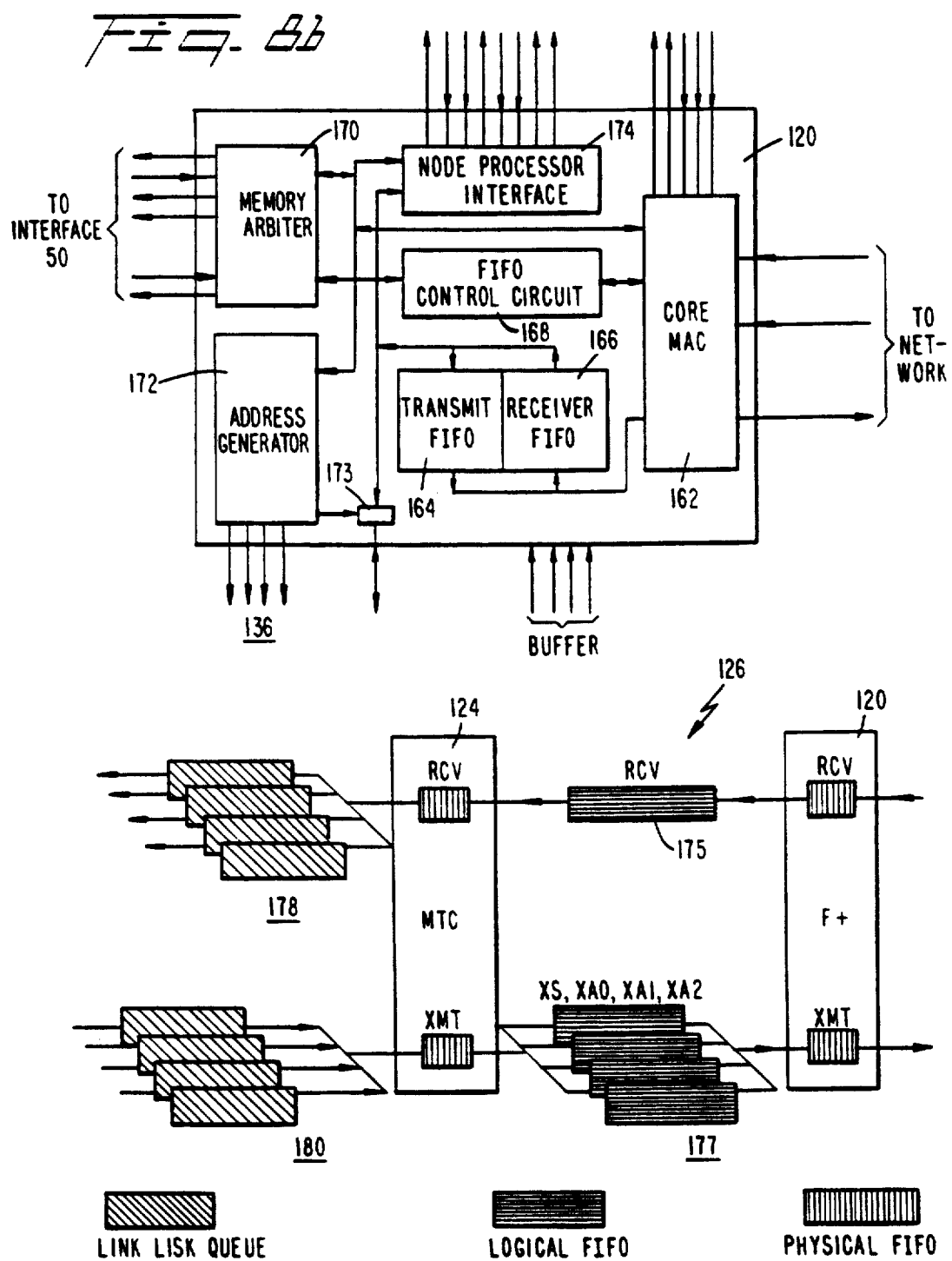

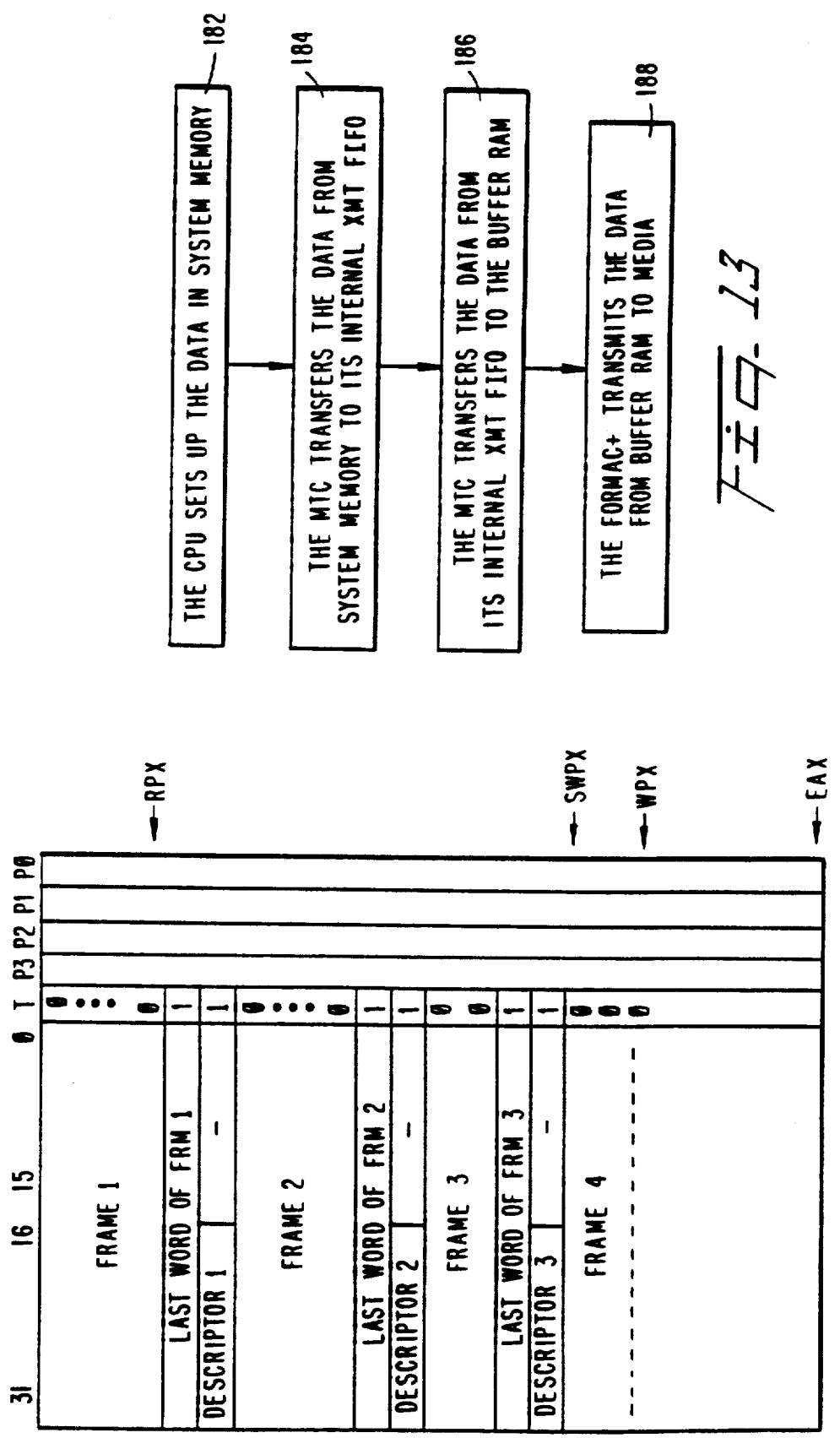

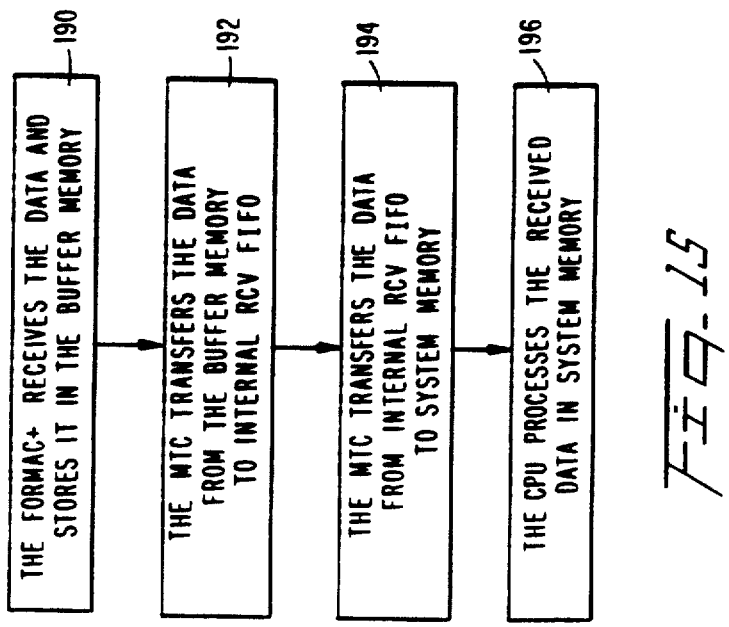
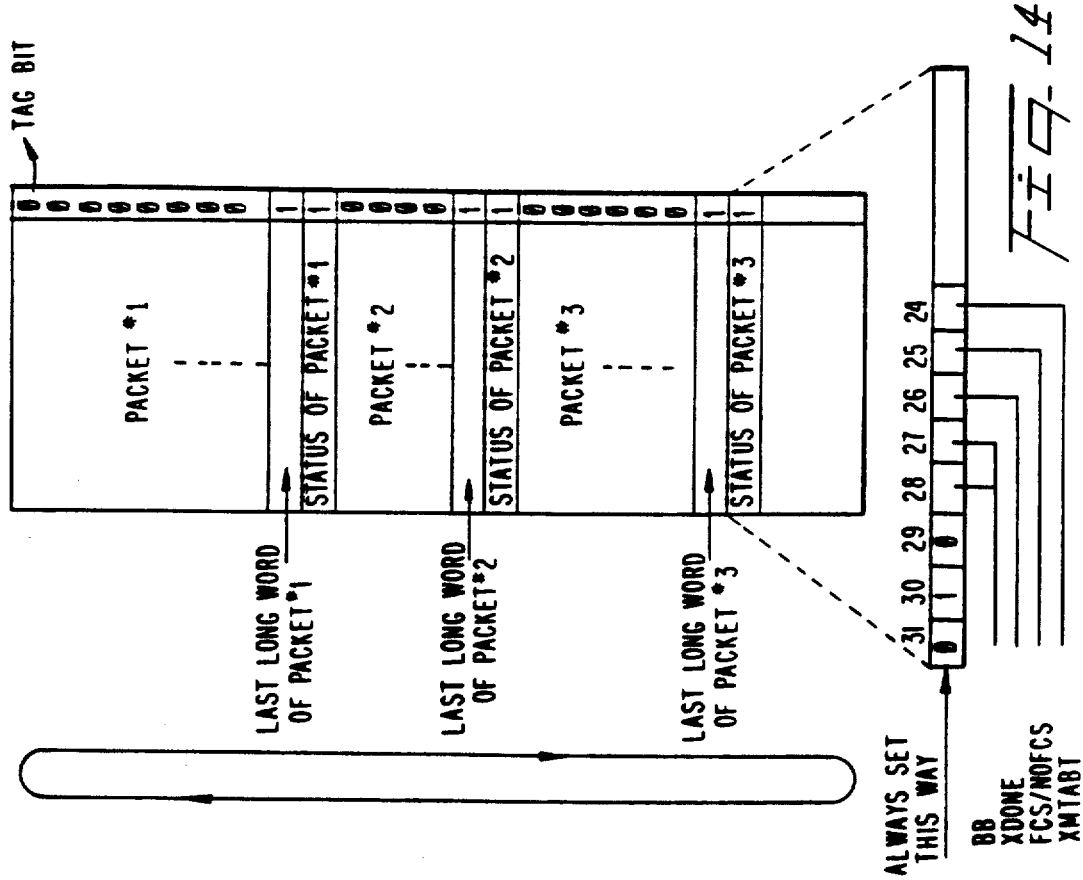

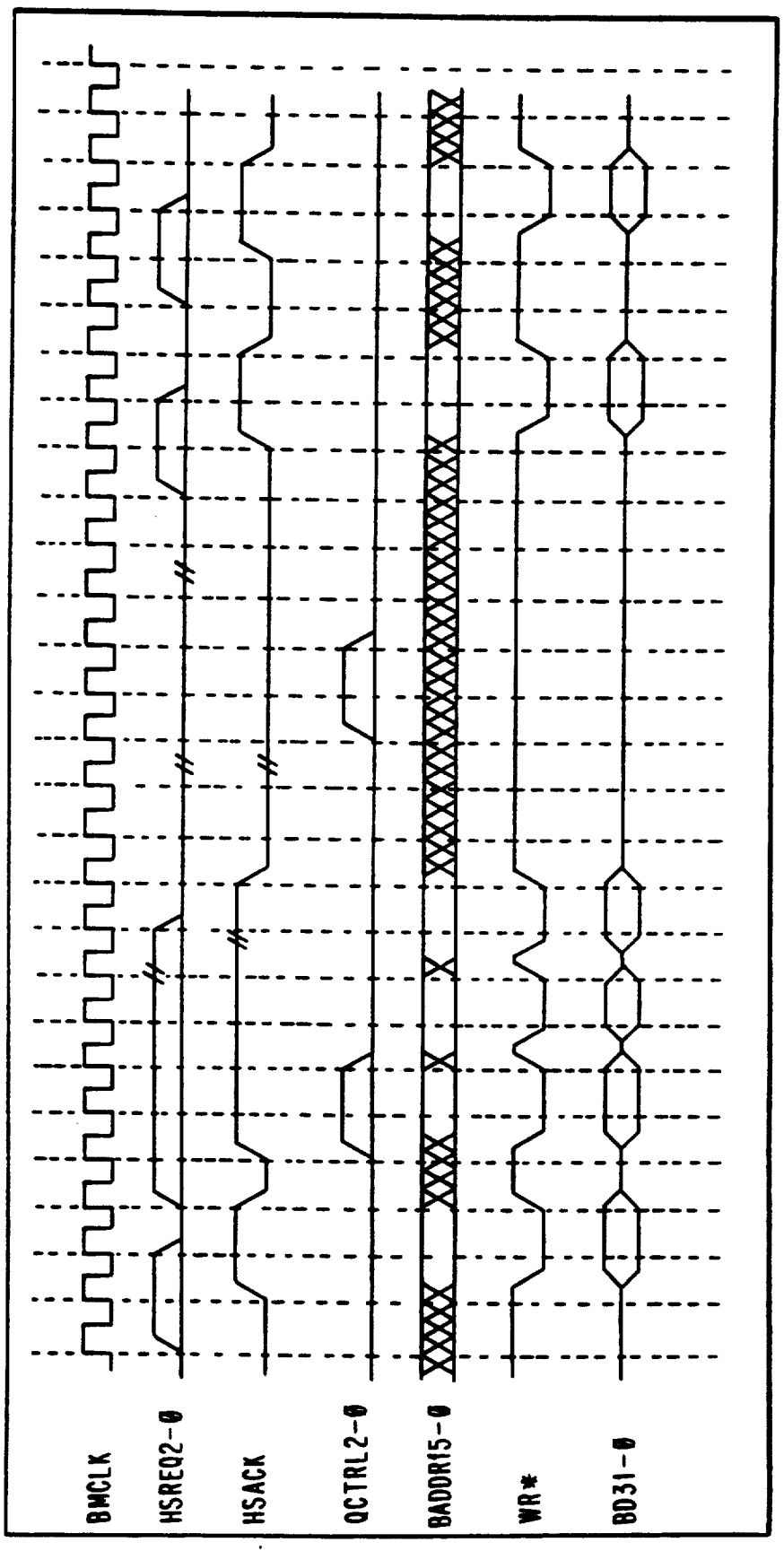

FDDI CONTROLLER HAVING FLEXIBLE BUFFER MANAGEMENT

TECHNICAL FIELD

This invention relates generally to buffer memory management in a bus master controller, and more particularly to a bus master having buffer memory sized in accordance with expected bus latency. A particular utilization of the invention is in a Fiber Distributed Data Interface (FDDI).

CROSS-REFERENCES TO RELATED APPLICATIONS

This application is related to the following copending applications, owned by the assignee of this invention, and filed on even date herewith:

(1) Firoozmand, Ser. No. 07/883,748, Memory Management System and Method (2) Firoozmand et al., Ser. No. 07/529,366, now U.S. Pat. No. 5,043,981, Transfer of Multiple Priority Inquiries Into Multiple Logical FIFOs Using a Single Physical FIFO (3) Firoozmand, Ser. No. 07/529,363, now U.S. Pat. No. 5,210,749, Configuration of SRAMs as logical FIFOs for Transmission and Reception of Packet Data (4) Firoozmand et al., Ser. No. 07/529,365, Implementing Multiple Level of Priorities in FDDI

BACKGROUND ART

Difficulty often exists in the design of a data network including at least one intelligent node wherein data must be moved between systems on the network. Data must be passed through many hardware and software components, each of which may impose a performance bottleneck. Design of a networking adapter to supervise transfer of data in such an environment requires an analysis of the targeted host system in which the adapter will reside. The designer accordingly will be required to consider both software and hardware interfacing issues.

Frequently, hardware architecture options are limited by the architecture of a pre-existing network operating system (NOS); the cost of tailoring the architecture of a NOS to a particular hardware architecture is prohibitive. However, to maximize the operating speed of the network it is preferable to minimize data movement in the memory of each station and to minimize intervention by the processor controlling the node.

There are two types of network operating systems. A type I NOS allows access to a flexible memory buffer pool to which or from which data is linked for particular applications. A type II NOS allows access to a fixed data transfer area for the data.

The type I NOS, manipulating pointers to link data to applications, has a higher overall system performance than a type II that requires data to be copied. The process of copying data during movement in memory represents a substantial loss in operating time as it increases system "overhead". If data is linked into applications directly from the area from which it was received, no copying of data is necessary and time is saved. It therefore is desirable that data be sent and received directly from system memory.

The issue underlying whether data can be sent or received directly from NOS buffers dictates the desirability of different hardware structures. There currently are three basic architectures for movement of network data within a host system, namely, (1) dual ported memory, (2) shared I/O ports and (3) intelligent bus master residing on a shared memory.

Dual port memory (DPM) is a method commonly used to interface high latency busses and also provides the benefit of isolating the network bandwidth from the system bus. (Bus latency is defined as the maximum time between the assertion by the controller of the request for the system bus and relinquishing the bus by the system.) A dual port memory allows the system bus to access the memory through one port, and the network controller to access it through the other port. The DPM decouples the local network controller bus requirements from the system bus. Because the high cost of DPM precludes building a large enough memory for processing packets in the DPM space, an economical application of DPM is to configure one to act as a large packet first in-first out (FIFO) memory between the host and the network controller. This configuration requires that the entire frame reside in DPM before the controller or host may act on it. Delay of data movement until the whole frame is in DPM will degrade overall performance.

The second network data movement architecture, which is equivalent to the DPM architecture, may be designed using low cost static RAM and a shared I/O port. However, the shared I/O port architecture must make use of either the DMA capability of the network controller, or a dedicated CPU to move data between the static RAM and the I/O port. Again, in this configuration the memory acts as a large packet FIFO and the system is shielded from the bandwidth and latency requirements of the bus controller. Shared I/O port architecture also requires that the entire frame reside in the buffer memory before the controller or host may act on it. This creates a delay that is detrimental to system performance.

The third architecture, intelligent bus master configuration, allows the network controller to take control of the system bus and read or write bursts of data directly into system memory during network reception and transmission. For a type I NOS, a bus master allows data to be received and transmitted from NOS buffers. A bus master minimizes the delay time that the data spends traversing between the system memory and the network cable, and as a result this method always has the highest put through for type I networks. Data received off the network cable is written into system memory immediately after it is deserialized and applied to an FIFO. Similarly, transmit data need only to be applied to an FIFO and serialized before being applied on the cable.

Current bus master network controllers restrict a designer by requiring that the host system guarantee a maximum bus latency that is less than the time it takes to fill the internal FIFOs of the controller with data from the network. The current generation of controllers also requires a guaranteed minimum data transfer rate for sustained reception and transmission.

In addition, the current generation of bus masters requires that the host always has free buffers available for storing received data. Reception of data from a network is asynchronous and a bus master must have free buffers allocated to store data as it arrives, or else the packet will be missed. The availability of free buffers is related to the type of network operating system that will be used. A type I NOS will be able to pass pointers to buffers fast enough to be able to accommodate the requirements of a bus master controller.

A type II NOS, that uses a fixed data transfer area, may or may not be able to empty and supply buffers fast enough for the real time requirements of the data rate on the network cable. A solution using a bus master is preferred for almost all network operating systems, except for certain type II systems which cannot provide NOS buffers fast enough for transmission and reception directly from them. The problem with these network operating systems is that network data must be buffered to a temporary location until an NOS buffer is free. If the network adapter is a bus master, the temporary location is in system memory. In a bus master configuration, the data must cross the system bus to the temporary location, then be coupled from the temporary location to the NOS buffers. If data is received and transmitted from memory located on the network adaptor, the "cross" of the system bus and the copy from the temporary location are combined into the same operation, saving a cycle on each transfer. On the other hand, efficient design of the network is severely restrained by variation of bus latencies as well as configurations of the data being transferred. Many systems cannot provide a low enough bus latency to allow the transmission and reception of data directly with system memory with existing bus masters, or worse, may not allow a controller to become a bus master. In such cases, an interface without the bus master restrictions is desirable.

One type of environment typically incorporating a bus master network, is a local area network (LAN) which allows a number of computers to share resources, including storage devices, programs and data files. Sharing of hardware such as disks, printers and connections to outside communications distributes the cost of hardware among participating devices. Discussion on the characteristics of local area networks is given in Appendix I to this specification.

A new standard of local area networking that is based on fiber optic components and systems has been developed by the American National Standards Institute (ANSI) X3T9.5 committee, known as the "fiber distributed data interface" (FDDI), defines a 100 megabit per second, time-token protocol implementing dual counter-rotating physical rings. Aspects of the FDDI standard, which defines the physical and data links of the OSI reference model, are summarized in Appendix II.

The high data rate of the FDDI standard imposes demanding timing requirements to the FDDI controller and to the system designer who uses the controller. As in other network operating systems, a desired architecture for network control is one that can become a bus master and can transfer data directly between the host-/node processor memory and the FDDI network with minimal CPU intervention.

A current implementation of an FDDI network is embodied in the Supernet (TM) chip set, developed by Advanced Micro Devices, Sunnyvale California. The Supernet (TM) chip set which has the architecture shown in FIG. 1, consists of an encoder/decoder (ENDEC) AM7984 and a data separator (EDS) AM7985 100, coupled to the optical medium (network) through an optical data link (not shown). The ENDEC/EDS 100 extracts a receive bit clock from serial packets received from the network, extracting timing to perform decoding and converting the bit stream to parallel form.

Connected to the ENDEC 100 is a Fiber Optic Ring Medium Access Controller, or FORMAC, 102 implemented by a AM79C83 device which determines when a node can gain access to the network and implements the logic required for token handling, address recognition and CRC error handling. When a packet is received, the FORMAC 102 strips away all the physical layer headers before sending the packet to a data path controller, or DPC, 104 (AM79C82) after detecting and discarding any start-of-packet and end-of-packet delimiters. Frames are checked by the FORMAC 102 for destination address, and the DPC 104 is notified when a match does not occur.

A buffer memory 106 formed of random access memory (RAM) temporarily stores packets of data to be transferred between the system memory 108 of the host or node processor 110 and the network. A RAM buffer controller, or RBC, 112 implemented by a AM79C81, generates addresses to the buffer memory 106 for received and transmitted packets and carries out buffer management; the only interface of RBC 112 with the host 110 is through DMA request channels which allow the host to access the buffer memory. Interface logic 114 (sometimes termed "glue logic"), which resides between the host 110 and buffer memory 106, must be particularized to the characteristics of the system bus. Accordingly, if the chip set is to be applied to a network having a different bus latency or other characteristic, the interface 114 must be modified.

As in other bus master architectures, in addition to requirement of customizing the interface logic 114, the size of the buffer (FIFO) 106 in the FDDI network that is required to compensate for bandwidth, speed and latency mismatches between the system bus and the network bus depends on several parameters including the bandwidth, i.e., clock rate, allowed bus occupancy and bus cycle time, of the user bus, whether use of FDDI is full- or half-duplex, the average latency of the user bus, number of accesses per burst and the size of fragments, i.e., partial frames, on the network. Experiments have shown that the size of the FIFO varies in size substantially, i.e., by an order of magnitude as a function of rather minimal changes in system parameters. As only a limited amount of FIFO can be incorporated on-chip with other components of the chip set, and the bandwidth of FDDI is high, external FIFO is required to accommodate for high bus latencies. On the other hand, to provide an amount of external FIFO sufficient to accommodate high latency applications would be burdensome in low bus latency applications which require only a limited amount of FIFO. It would be advantageous to provide some means to enable the amount of FIFO to be provided as a component based on expected bus latency for a desired application. In this manner, it would be possible to implement the required amount of FIFO directly on-chip with other components of a bus master chip set in low bus latency applications, and in high latency applications add only the amount of external FIFO required to avoid loss of packets.

DISCLOSURE OF THE INVENTION

Accordingly, one object of the invention is to improve a bus master type network controller.

Another object of the invention is to provide a bus master architecture that is independent of bus latency.

A further object is to provide a flexible architecture in an FDDI controller wherein the amount of FIFO in the interface is a function of bus latency.

A further object is to provide a bus master buffer management that is adaptable to various utilization architectures.

A still further object is to eliminate or reduce the requirement of high speed static buffer memory in a bus master architecture operating on a relatively low latency bus.

Another object of the invention is to implement external SRAM as a FIFO memory in a bus master architecture operating on a relatively high latency bus, wherein the size of the FIFO that is provided depends on the average latency of the bus.

A further object is to carry out memory transfers between system memory and a buffer in a bus master architecture that are transparent to the host.

Still a further object of the invention is to implement improved interface between the ENDECs and the system memory of an FDDI network.

The above and other objects of the invention are achieved at least in part by providing in a network comprising a processor and a system memory residing on a system bus having a predetermined average bus latency, a bus master architecture for interfacing the system bus to a network containing other processors and system memories. In accordance with the method of this invention, a random access memory for buffering data between the system bus and network in the architecture is configured to have at least one logical FIFO for storing data. The size of the logical FIFO configured is related to the predetermined average bus latency.

Preferably configured in the random access memory are (1) at least one additional logical FIFO for storing data outgoing to the network and (2) a first logical FIFO for storing data incoming from the network. Data packets stored in the system memory are formatted into frames to be transmitted on the network and stored in the first logical FIFO sequentially and contiguously to form at least one queue. In response to a request for transmission by the network, a number of frames are read in sequence from the first logical FIFO and transmitted on the network.

Frames of data received from the network are stored sequentially in the additional logical FIFO to form a queue. The frames of data are read from the additional logical FIFO and transmitted to the system memory when the system is enabled to receive data. Preferably, boundaries between frames are demarked by tag bits and status bits are appended to each frame.

Apparatus provided in accordance with the invention comprises a network access controller for accessing data on the network, a random access memory, and a network DMA (direct memory access) controller to configure the random access memory to have at least two logical FIFO for storing data, one for transit and one for receive. The size of the logical FIFO is related to the predetermined average latency of the system bus. The network DMA controller further includes means for controlling transfer of data between a system memory and the logical FIFO.

Preferably, the logical FIFO is comprised of a static random access memory (SRAM). Optionally, the static random access memory may reside external to the network access controller and the DMA controller. Alternatively, the static random access memory may comprise a SRAM on a common chip with at least one of the two controllers. At least one of the network access controller and the network DMA controller may also include an on-chip FIFO to compensate for mismatches between system bus and network clock rates.

In accordance with one aspect of the invention, the Network Access Controller configures the random access memory to have (1) a first logical FIFO for storing data incoming from the network bus access controller to the DMA controller and (2) at least one additional logical FIFO for storing data outgoing from the network DMA controller means to the network access controller.

In accordance with another aspect, the network DMA controller formats data packets stored in the system memory into frames to be transmitted on the network and stores the frames in the first logical FIFO sequentially and contiguously to form at least one queue. Further, the network access controller preferably is responsive to a request for transmission to read a number of the frames in sequence from the first logical FIFO and for transmitting that number of frames on the network. Handshaking between the network access controller and DMA controller enables frames of data to be transferred from the buffer to the network access controller as the controller becomes available during memory arbitration, to access the network.

In accordance with a further aspect of the invention, the network access controller receives frames of data on the network and stores the frames sequentially in the additional logical FIFO to form a queue. Following handshaking between the network access controller and the DMA controller, the DMA controller reads the queue of data frames in the additional logical FIFO and transmits the data frames to the system memory. Boundaries between frames are demarked by tag bits, and status bits are appended to each frame.

A preferred application of the system just described is in FDDI. In this regard, in accordance with another aspect of the invention a network controller is provided for a Fiber Distributed Digital Interface (FDDI) network. The FDDI is of a type having a plurality of processors each having a system memory and residing on a system bus having a predetermined average bus latency, and an optical medium forming a digital data communication path among the processors. The network access controller comprises a first device (MAC) implementing a timed token data protocol for accessing the optical medium and configuring a random access memory to have at least one logical FIFO for storing packet data; the size of the logical FIFO is related to the predetermined average bus latency. The controller further comprises a second device (MTC) to control transfer of data between the system memory and the logical FIFOs. Handshaking is carried out between the first and second devices to control read and write operations of the logical FIFO in response to requests by the system for access to the optical medium and data available on the optical medium for reception by the system.

As the size of each logical FIFO is determined in accordance with the average latency of the system bus, in the network interface described, the architecture of the interface is the same both for high latency and low latency bus applications. When applied to a low latency bus, all the SRAM that is required may be able to be implemented on-chip with other components of the network interface. When applied to a high latency bus, any amount of external SRAM required may be added to the interface. Thus, as it is only the size of the SRAM containing the logical FIFOs that will change depending on bus latency, the interface is transparent to the type of network to which it is applied.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 7 is similar to FIG. 6, with separate node processor and host.

FIG. 8(a) is a more detailed diagram of the network DMA controller in the network interface architecture shown in FIGS. 3-7.

FIG. 8(b) is a more detailed diagram of the network access controller shown in FIGS. 3-7.

FIG. 9 is a diagram showing data flow carried out in the network interface.

FIG. 12 is a diagram showing a buffer memory transmit queue.

FIG. 13 is a flow chart showing how data to be transmitted on the network is moved from the system memory.

FIG. 14 is a diagram of transmit packets queued in the buffer memory.

FIG. 15 is a flow chart showing how data received from the network is moved to the system memory.

FIG. 17 is a signal timing diagram showing unloading receive frames by the buffer memory.

FIG. 18 is a signal timing diagram showing loading transmit frames in the buffer memory.

FIG. A-1 is a simplified block diagram of an FDDI ring composed of a variety of station types.

FIG. A-2 is a diagram showing the format of an FDDI packet.

FIGS. A-3(a) and A-3(b) are diagrams showing operation of the MAC sublayer in FDDI specifications.

BEST MODE FOR PRACTICING THE INVENTION

Overview

Figure 2:
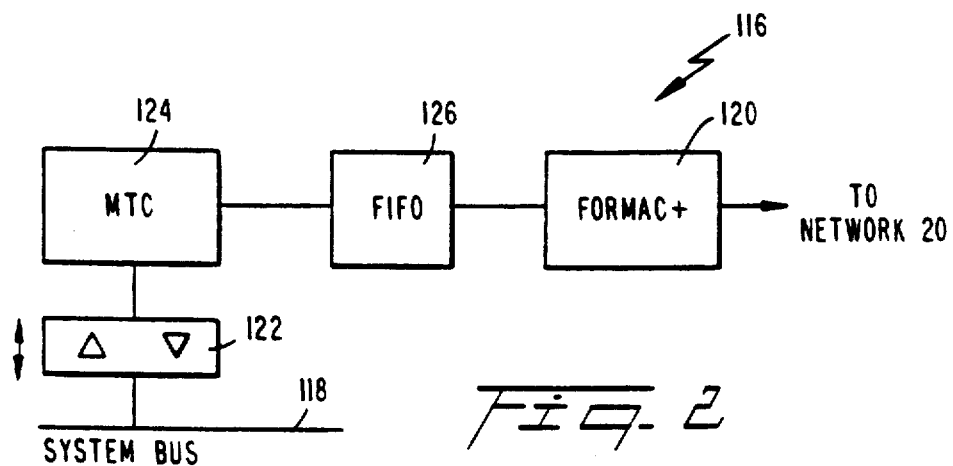
FIG. 2 is a simplified block diagram of a network interface in accordance with the invention implemented as a simple adapter.

Referring to FIG. 2, the invention provides a bus master architecture, shown generally as 116, between a system (user) bus 118 and a network 20. The principal components of the bus master architecture 116 comprise a network access controller 120 for accessing the network 20, a receiver/transmitter pair 122 coupled to the system bus 118 and a network DMA (direct memory access) controller 124 for controlling transfer of data between at least one system memory (not shown) on the system bus and a buffer, configured to have at least one FIFO (first in-first out) memory 126, connected between the DMA controller and the network access controller. The network access controller 120 implements proper network access protocol, receiving and transmitting frames of data while carrying out any required housekeeping functions such as frame stripping error checking and bus arbitration. The network DMA controller 124 operates as a front end bus master, communicating with the host or node processor to gather or scatter data from and among system memories and the buffer memory while minimizing movement of data in the memory. Details of the components shown in FIG. 2 shall be provided hereinafter.

Of importance to the bus master architecture shown in FIG. 2, provided in accordance with the invention, is its characteristic of supplying a complete path between the network and host/node processor memory on the system bus while maintaining the same network architecture independent of bus latency. Data transferred between the system and the network is stored in FIFO 126, in frames that are demarked from each other by tag bits and characterized by status words. The size of the FIFO memory required depends on the average latency of the system bus; the architecture of the network remains the same independent of bus latency. This is because no variations in logic circuitry ("glue logic") interfacing controllers 120 and 124 to the system bus is required, as it is in the architecture of FIG. 1.

The FIFO 126 can be located either outside the controllers 120 and 124, as shown in FIG. 2, and/or can be located on-chip with at least one of them. Preferably, some FIFO memory is included on-chip with network access controller 120 or DMA controller 124 so that no external FIFO would be necessary for application of the network on low latency system buses. In a high latency bus application the necessary amount of FIFO can be added as external memory. Data that cannot be accommodated by the on-chip FIFO will "spillover" to the external FIFO. Accordingly, the network, can be "tailored" to accommodate a system bus having any particular average latency, while the network architecture remains constant, i.e., there is no necessity to revise any interface or glue logic circuitry.

Figure 3:
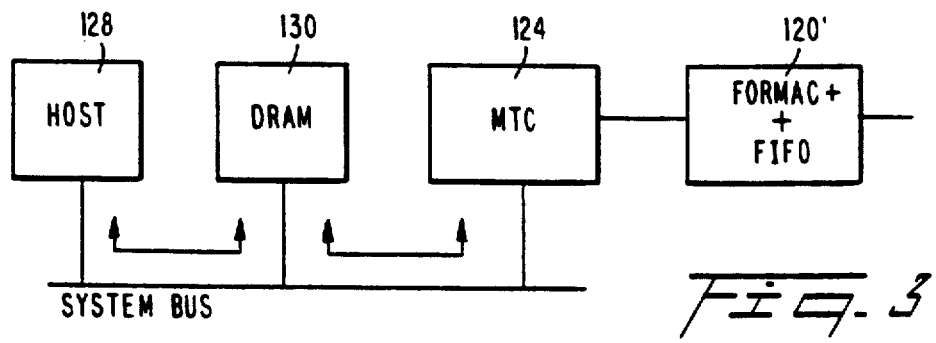
FIG. 3 is a diagram of the network interface in an integrated adapter on a low latency system bus.

For example, as the network shown in FIG. 2, being a "dumb" plug-in adapter configuration, is assumed to reside on a high latency system bus, a large external FIFO memory 126 is required and is shown therein. On the other hand, in FIG. 3 an integrated adapter configuration having a network access controller 120' and network memory controller 124, is integrated with a host 128 and its system memory 130. As the host may be able to grant the interface fast access to system memory 130 and is therefore a low latency bus application, the interface buffer memory is configured to be on-chip with the network access controller 120'.

Figure 4:
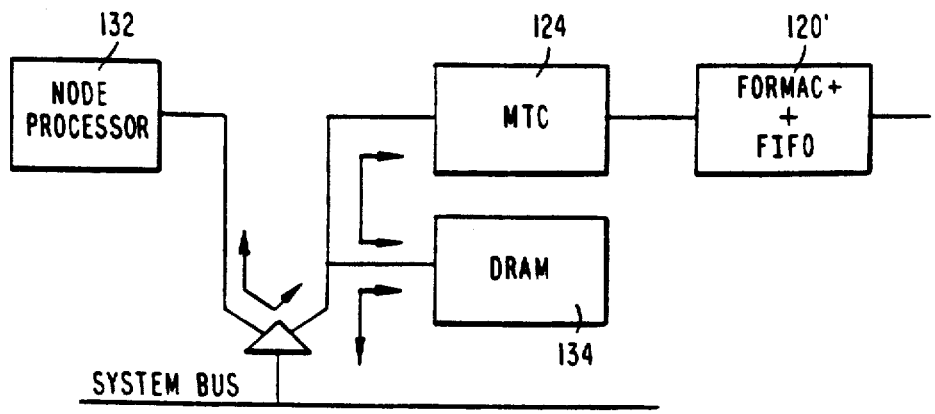
FIG. 4 is a diagram showing the network interface applied in a slave "smart" adapter, on a low latency shared bus.

In another configuration shown in FIG. 4, there is a node processor 132 and shared memory 134, and a network access controller 120' with an on-chip buffer and DMA controller 124 being implemented in a slave adapter configuration. Because the configuration of FIG. 4, like that of FIG. 3, typically is on a low latency bus, the interface buffer is on-chip with the network access controller 120'.

Figure 5:
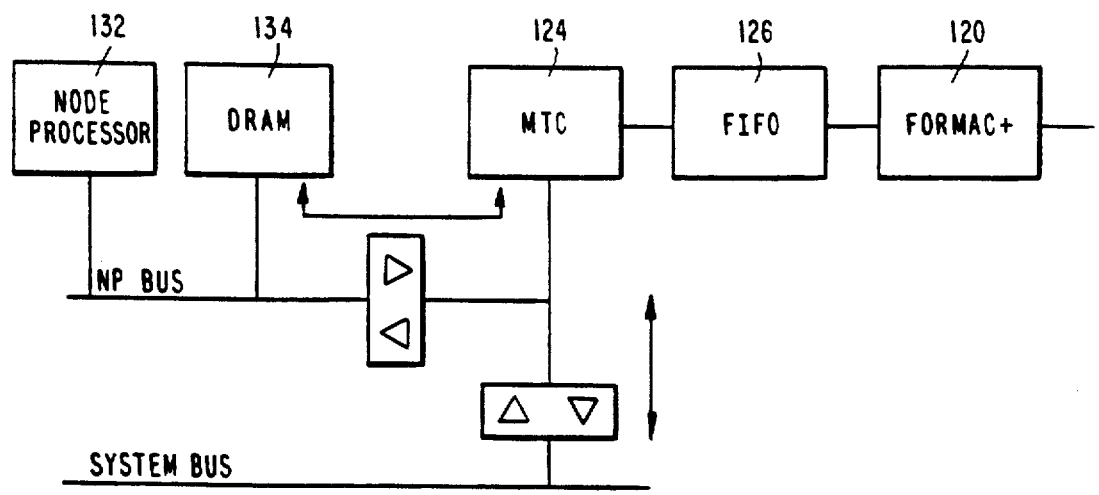
FIG. 5 is a diagram showing the network interface in a master "smart" adapter, on a high latency bus.

In another configuration shown in FIG. 5, the network access controller 120 and DMA controller 124, together with external interface buffer 126, are implemented in a smart adapter with a node processor 132. This configuration enables scattering and gathering of data to and from the node processor 132 as well as system memory 134. The external interface buffer memory 126 may be incorporated to accommodate the high latency of a typical system bus. The network access controller 120 configures the buffer memory 126 to have multiple logical FIFOs and controls access to this memory. Furthermore, in the environment of FDDI the controller 120 implements timed token protocol to access the FDDI medium, transmitting, receiving, repeating and stripping frames, and carrying out other FDDI medium access control protocol. The controller 120 further controls access to the buffer memory 126, maintaining pointers to buffer transmit and receive FIFOs and interfacing to the network DMA controller 124. The controller 124 in turn interfaces the system bus and external interface buffer memory, and controls scattering and gathering of data from and to the system memory using a buffer management architecture that minimizes data movement in memory. These operations shall be described in detail hereinafter. In this regard, however, although the description of the network interface of the present invention is made in the context of an FDDI network, it should be recognized that the interface has general application to bus masters in other environments as well.

Figure 6:
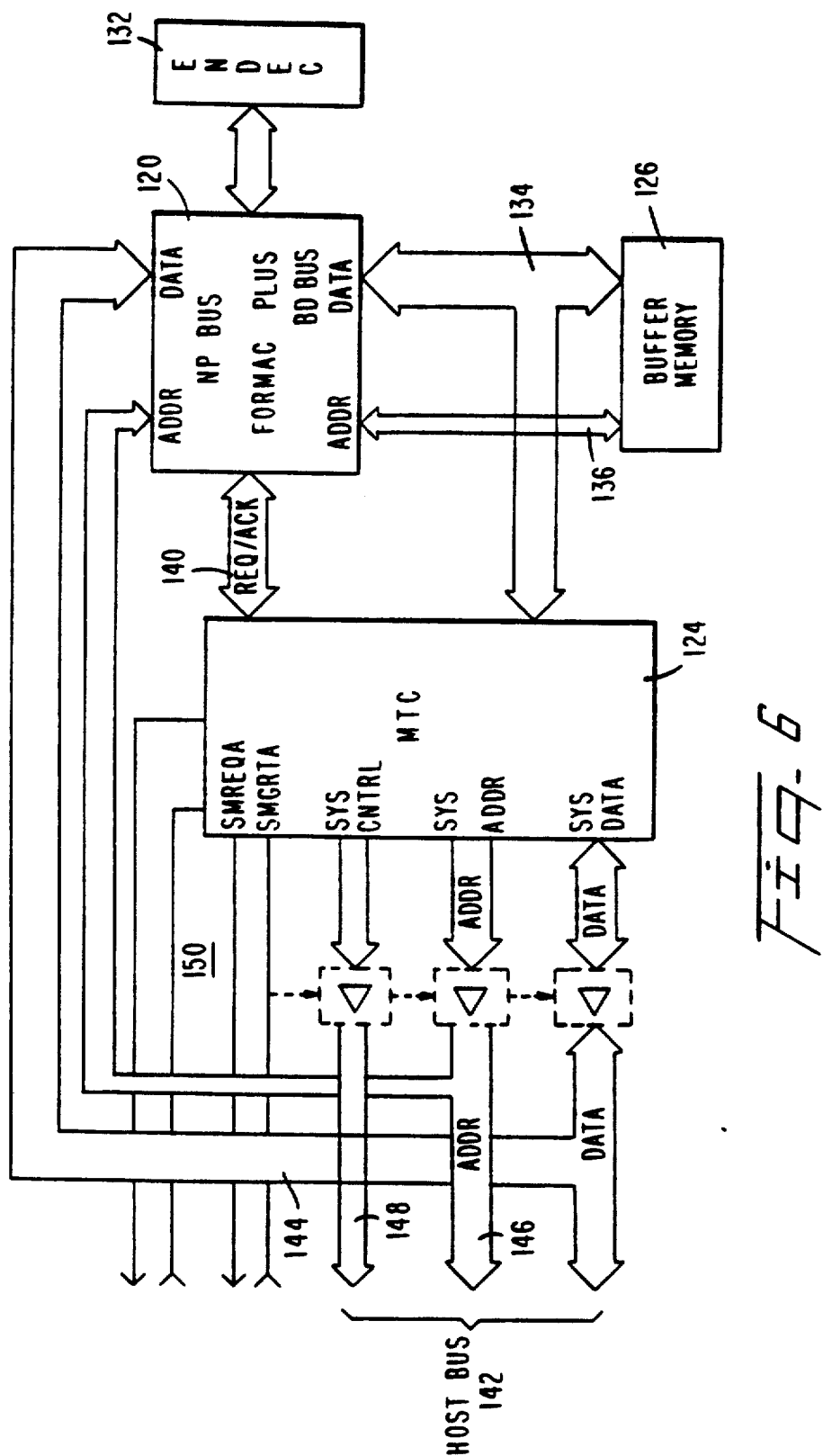
FIG. 6 shows a more detailed implementation of the network interface, with a common node processor and host.

FIGS. 6 and 7 are more detailed block diagrams of the interface. In FIG. 6, a node processor and host are combined as one system, and the network access controller 120 and DMA controller 124 incorporate an external interface buffer memory 126 that may either be in lieu of, or in addition to, an internal buffer. In FIG. 7, a node processor and host are presented as two separate systems to enable work to be shared between the two for processing data. The architecture of this configuration is similar to that of FIG. 6, with the interface residing between the network and separate node processor and host buses each carrying respective data, address and control lines as shown.

Figure 1:
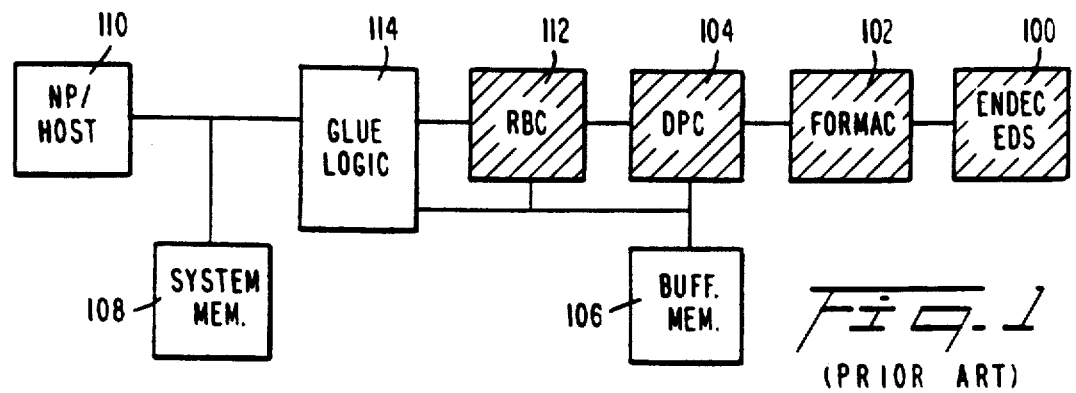
FIG. 1 is a block diagram of one implementation of an FDDI network of a type known in the prior art.

The network access controller 120 in FIGS. 6 and 7 is connected to the network through an ENDEC 132 that is similar in function to ENDEC 100 in the architecture of FIG. 1. The ENDEC 132 receives data frames from the network access controller 120, and performs appropriate encoding of the frames before converting the data from parallel to serial format and carrying out other "housekeeping" functions to satisfy FDDI specifications. Not shown is a data separator (EDS) that extracts timing information from the network to be used by ENDEC 132 to perform its decoding and other housekeeping for transmission to the network access controller 120. An elasticity buffer in the ENDEC 132 permits nodes to operate at slightly different clock rates. Also not shown but incorporated with the ENDEC and EDS is an optical data link (ODL) that receives an optical signal from the network medium, converts it into an electrical waveform and performs appropriate amplification. A signal conditioner determines whether the output of the ODL is a logic 1 or 0.

The network access controller 120 is interfaced to buffer memory 126 through a data bus 134 common to network DMA controller 124 and an address bus 136. Handshaking between the controllers 124 and 120 to control movement of data to and from the network in a manner to be described in detail hereinafter is carried out on REQ/ACK bus 140.

The network DMA controller 124 resides on a host bus 142 comprising a shared data bus 144 and address and control buses 146, 148. Control signals to the network DMA controller 124 are interfaced to the host on lines 150 that include bus request and bus acknowledge lines (BUSREQ/BUSACK). How the network access and network DMA controllers 120, 124, together with buffer memory 126, cooperate to carry out network interface operations on the various buses shown, shall be described hereinafter with reference to FIGS. 17-20.

Network DMA Controller 124

The network DMA controller 124, shown in detail in FIG. 8(a), comprises an interface circuit 150 connected between the network access controller 120 and the network DMA controller 124. The interface 150 communicates with a transmit section containing at least one, and preferably four, FIFOs 152, a receive section 154 containing a FIFO, and a packet buffer management circuit 156. The interface 150 transfers data stored in the transmit section 152 to the external buffer memory 126 as well as transfers data from buffer 126 to receive section 154. Transfers of data from the buffer 126 to the receive section 154 are made on command by the network access controller 120 when data on the network is available to the system and other conditions are satisfied; transfer of data from transmit section 152 are carried out when data from the system memory is available in the transmit section, the data queue therein is unlocked and other conditions are satisfied. Buses connected to the interface 150 are described hereinafter in connection with FIGS. 17-20.

Packet buffer management circuit 156 indicates to the network access controller 120 what type of data is present in the transmit section, so as to load the buffer memory in appropriate queues depending on the priority of data in accordance with FIFO specifications. If a queue becomes full, the interface 150 signals the packet buffer management circuit 156 and finishes emptying the current FIFO; if a transfer is incomplete, the circuit 156 continues with other pending transfers until the queue becomes unlocked. At that time any suspended transfer is continued. If transmit and receive data are requested from the FIFOs in sections 152 and 154 at the same time, the interface 150 prioritizes these transfers based on the sequence of events in accordance with a predetermined transmit and receive priority order.

The packet buffer management circuit 156 decodes command word codes, transmits, requests clear error commands and sends appropriate information to the system memory interface 160 as well as to transmit section 152. The packet buffer management circuit 156 prioritizes command requests, transmit requests from FIFO 152 and receive requests from FIFO 154. The management circuit 156 then issues commands to a system memory interface 160 to grant either transmits or receives or to process one of the commands, and is interfaced to the system through CPU interface 161.

Transmit section 152 maintains status of all transmit queues and prioritizes operations in a predetermined priority. The FIFO 152 carries out byte ordering and data gathering, and formats the data into FIFO oriented packets to be processed by the network access controller 120. Various transmit queues in the transmit section 152 are controlled, so that when the buffer memory 126 fills up a queue, queue switching is carried out. All necessary information for the locked queue is stored so that operation can be resumed when the queue becomes unlocked. The FIFO is also used for rate adaptation between system memory interface 160 and network access control interface 150. Buffering is required in the network DMA controller 138 because data transfer rates on the system memory bus and on the network are independent.

Receive section 154 receives FIFO oriented frames from external buffer memory 126 and scatters them into receive buffers in the system memory. The receive buffers are pointed to by four descriptor rings, the first three of which are programmable to receive different types of FDDI packets based on the FC field of the FDDI protocol, as described in copending application (1) supra, incorporated herein by reference in its entirety. The receive section also may be programmed to be used to split header information from received data into different buffers, as also described in copending application (1). The section 154 FIFO also provides rate adaptation between the network and system memory in the same manner as the transmit FIFO 152.

It is important to recognize that the on-chip FIFOs, in sections 152 and 154 of the network DMA controller 138, are capable of storing, in queues, FDDI packets the number of which depends on system bus latency. The greater the latency of the system bus, the longer the burst that must be processed to utilize the bus efficiently; the longer the burst, the larger the FIFO size requirement. As it is impractical to provide a large FIFO on chip with the network DMA controller 124, an important aspect of the invention is in the provision of an optional external buffer memory 126 that "outboards" the receive and transmit section FIFOs in blocks 152 and 154. Thus, in a low bus latency environment, the storage capacity of the FIFOs in the transmit and receive sections 152 and 154 are sufficient to accommodate storage of packets so that no external buffer memory 126 is required. On the other hand, in high bus latency applications, the size of the buffer memory 126 required can be computed, and only the necessary amount incorporated in the system.

There are accordingly two types of FIFOs in the interface, that is, physical FIFOs that are on-chip with the network access controller 120, the network DMA controller, or both, and logical FIFO memories configured in the external buffer 126 by firmware pointers. There is no particular logical demarcation between the two types of memories. However, data is stored in them in successive storage locations to form queues beginning with the physical FIFO and overflowing from it into the logical FIFO. Alternatively, only one or the other of physical and logical FIFOs can be provided based on expected average bus latency.

System memory interface (SMI) 160 comprises a high speed programmable bus interface, address generation circuitry and storage for the system memory. The interface 160 also contains end-of-ring detection circuits for buffer management in the system memory, and a primary control state machine for the system memory interface.

Signals supplied from the system memory interface 160 at lines 163 to the system are synchronous with a system clock SCLK (not shown). These signals request access of one system memory from an external arbiter (not shown). If there are separate node processor and host memory areas, signals from SMI 160 will access one memory or the other. Another signal grants the network DMA controller 124 the right to access one system memory or the other. An address bus at the output of SMI 160 addresses all system memory accesses, and a system memory read/write line indicates whether data is being transferred from the system memory to controller 124 or from the controller to the system memory. Other signals at the output of SMI 160 indicate status of the system memory, indicate errors, and enable or disable external data buffers to prevent bus contention between reads and writes to system memory. Another SMI signal activates a latch in the SMI to latch data to the system memory for a write operation.

Signal lines at CPU interface 161 include a signal indicating that the network DMA controller 124 must read a command from memory and directing the controller to carry out the memory access. Another line signals the CPU that the network DMA controller has written a new status word in memory, and another deasserts the interrupt.

At the output of the interface 150 are a host request bus that contains encoded requests to access buffer memory 126 through the network access controller 120. Depending on the code carried on the host request bus the buffer memory 126 is accessed to read data or to write data in any of four transmit queues. The read request retrieves receive packets from the buffer 126 and stores them in system memory. Write requests transfer packets into buffer memory for transmit. Also at the output of the interface 150 is a host acknowledge line carrying a signal indicating that the present write or read request of the network DMA controller 124 is being granted by the network access controller 120. Together with this signal, buffer memory 126 is enabled, and data is present on a data bus, data parity bus and data tag bus, to be described hereinafter. The interface also provides a read output to latch data into the network DMA controller 124 when the network access controller 120 reads data from buffer memory 126 into the DMA controller. A received data line indicates that received data is present in the buffer 126 and is ready to be transferred to the system memory. Other lines, to be described hereinafter, indicate the status of the currently accessed transmit queue in buffer 126.

Network Access Controller 120

Access controller 120, shown in more detail in FIG. 8(b), comprises a core medium access control (MAC) 162 for handling FDDI MAC protocol, similar in structure and function to the network access controller 102 of FIG. 1. The data I/O port of MAC 162 is connected to transmit and receive FIFOs 164 and 166. Data received from the network is supplied by the receive FIFO 166 to the external buffer memory 126; data from the external buffer to be supplied to the network is stored in transmit FIFO 164. A FIFO control circuit 168 coordinates loading and unloading of the transmit and receive FIFOs 164 and 166 based on memory arbitration decisions made by a memory arbiter 170.

An address generator 172 supplies required external buffer memory addresses on address bus 136 based on the access decision of the arbiter which determines whether the network or the node processor can access the buffer memory. A node processor interface 174, whose data input is controlled by address generator 172 via gate 173, decodes instructions from the node processor, collects chip status and distributes control information throughout the controller 124.

The transmit and receive FIFOs 164 and 166, on-chip with network access controller 120, store a number of data packets depending primarily on the latency of the system bus and burst length, in a manner similar to the transmit and receive sections 152 and 154 of the network DMA controller 124. Accordingly, no external buffer memory is required for low bus latency applications wherein the sizes of the on-chip FIFOs are sufficient to store the FIFO packets.

Buffer Memory 126

In accordance with another important aspect of the invention, the external buffer memory 126 is configured to have a receive FIFO 175 containing a queue of data received from the network and at least one, but preferably four, transmit FIFO 177 each containing a queue of data to be supplied to the network. Four queues are shown in FIG. 9 to represent one synchronous queue and queues containing three levels of asynchronous priorities of data in accordance with FDDI specifications. How the data priorities are related to each other and are supplied to the network are detailed in copending applications (2), (3) and (4), supra, incorporated herein by reference. Because the FIFOs are configured in a buffer memory which, in the preferred embodiment, is a static random access memory (SRAM), using firmware pointers in a conventional manner to identify the beginning and end of each FIFO as well as to identify the read and write addresses of the queues stored therein, such a FIFO as 175, 177 is described herein as being a "logical FIFO". This is to be distinguished from physical FIFOs 152, 154, 164 and 166 that are on-chip with one or both of the network DMA and network access controller 124 and 120.

Data received from the network is supplied by the network DMA controller 124 to the system memory through link list queues 178, and similarly, data is transmitted to the medium from the system memory through link list queues 180 that correspond to the synchronous and three levels of asynchronous priorities, described in detail in copending application (1), supra, and incorporated herein by reference.

Figure 10:
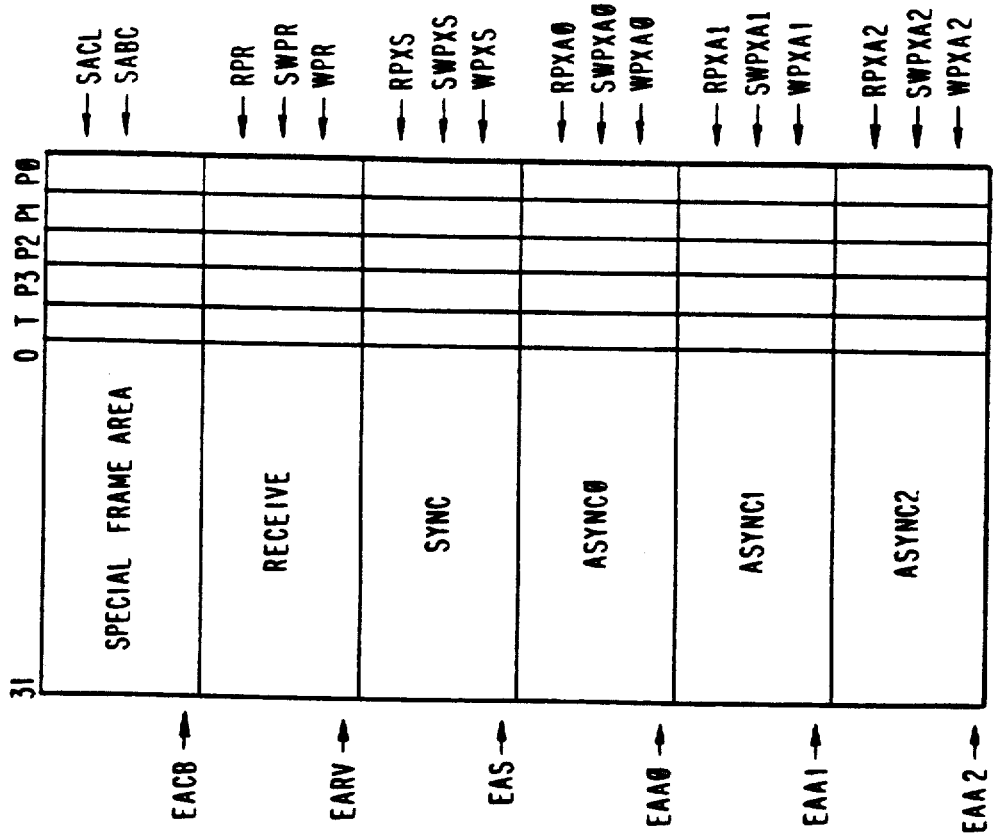
FIG. 10 is a diagram showing the organization of the buffer memory in queues implemented in the network interface.

Prior to any operation involving the buffer memory 126, the node processor must load into the buffer the end addresses of all the queues. Queue pointers are in the order shown in FIG. 10, i.e., to define first the end of a special frame area, then a receive queue and next transmit queues in the order of sync queue followed by three levels of priority of asynchronous queues. If any queue is to be ignored, its end address is the same as that of the previous queue. Also programmed by the node processor are the read/write pointers of all queues being used, as shown in the right hand column of FIG. 10; the end address pointers are shown in the left hand column of the figure.

Special frames stored in the special frame area are claim, beacon and auto-void frames used in the FDDI specifications, established during initialization of the network access controller 124.

The format of the transmit frames, shown in FIG. 12, consists of aligned data at bit positions 0-31 followed by a tag bit (T) and parity. The last word of each frame as well as a descriptor word has the tag bit set to "1", demarking the end of the frame. Packets to be transmitted are set up in the system memory by the host or node processor.

The transmission procedure is shown in overview in FIG. 13 in four principle steps. Following set-up of data in the system memory, in step 182, the network DMA controller 124 transfers (step 184) the data from the system memory to its internal transmit FIFO 164 shown in FIG. 8(b). The data next is transferred from the transmit FIFO 164 to external buffer memory 126 (step 186) and then from the buffer 126 to the network (step 188). Transmit packets queued in the buffer 126 are shown in FIG. 14.

Loading of Transmit Frames In Buffer Memory

The format of the transmit frames shown in FIG. 12 are loaded by the host and network DMA controller 124 into the buffer memory 126 under control of the network access controller 120. This is carried out in response to a request by the network DMA controller 124 to write data to the buffer 126, encoded based on the particular queue being requested. Packets preferably are loaded into the buffer 126 at the same time that the buffer is being unloaded for transmission so as to maximize bus utilization efficiency and avoid overrun or underrun conditions, as described in copending application (2), supra.

Unloading of Transmit Frames from Buffer Memory

After a frame has been located into the buffer memory 126, determined by the network access controller 124, either it has been confirmed that an entire frame is loaded or that the number of words of the frame written into the memory exceeds a transmit threshold, as described in copending application (3), the frame is ready for transmission to the network.

When a transmission to the network is available to the system, i.e., a token on the FDDI network is captured for transmitting a queue and transmission conditions for that queue are satisfied, transmission begins and the frame is read by the network access controller 124 until the end of the frame, characterized by a logic "1" tag-bit, is encountered. At this time, frames of data are already being read into the buffer for subsequent transmission, before the buffer is emptied, as described in copending application (2), supra. That is, while transmission is in progress and after complete transmission of a frame, the network access controller 124 fetches more data from the selected queue of the FIFO into its on-chip transmit FIFO 164 for transmission if a complete frame is in the buffer or if the content of the buffer exceeds a preprogrammed frame threshold value. If neither condition is satisfied, the network access controller 124 checks other queues, in order of priority, for transmission.

Transmission from a queue is completed when the queue is emptied. However, if the transmit FIFO 164 empties in the middle of a frame, an underrun condition is implied, and the current frame is aborted.

Queues of transmit data stored in the buffer memory have the format shown in FIG. 14, wherein each frame contains long words characterized by a tag bit "0" and a last long word characterized by a tag bit "1". Following the last word of the packet is a status word also characterized by the tag bit "1". The status word reflects the status of the data buffer as well as the status of the packet including a number of predetermined bits, bits defining at which byte boundary the last word of data ends, bits copied from the status that the network DMA controller obtains from the system memory and a bit indicating whether the packet contains an error and should be aborted.

Loading of Receive Packets in Buffer Memory

Figure 11:
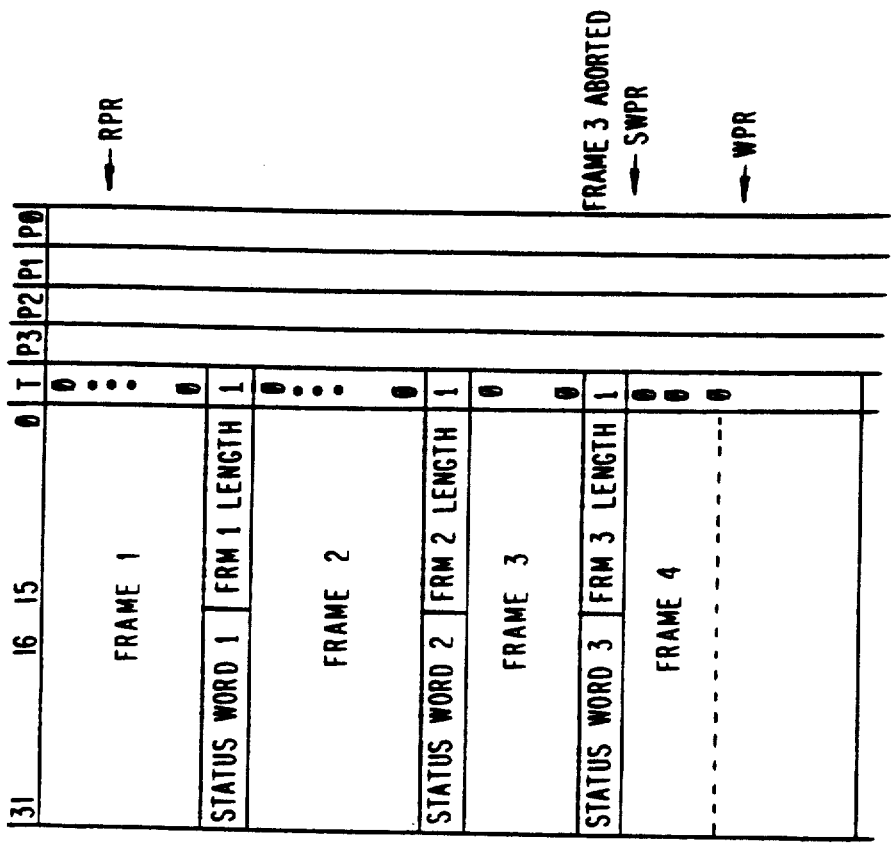
FIG. 11 is a diagram showing the structure of a buffer memory receive queue.

Reception of packets, shown in overview in FIG. 15, requires reception of data packets by the network access controller 124 (step 190) for storage in external buffer memory 126 (step 190), and transfer of the packet data from the buffer to the internal receive FIFO 166 of network DMA controller 124 (step 192). The network DMA controller 124 then transfers the packet data from the internal receive FIFO 166 to the system memory (step 194) to be processed by the host or node processor (step 196). The format of receive frames stored in the buffer memory 126 is shown in FIG. 11.

Figure 16:
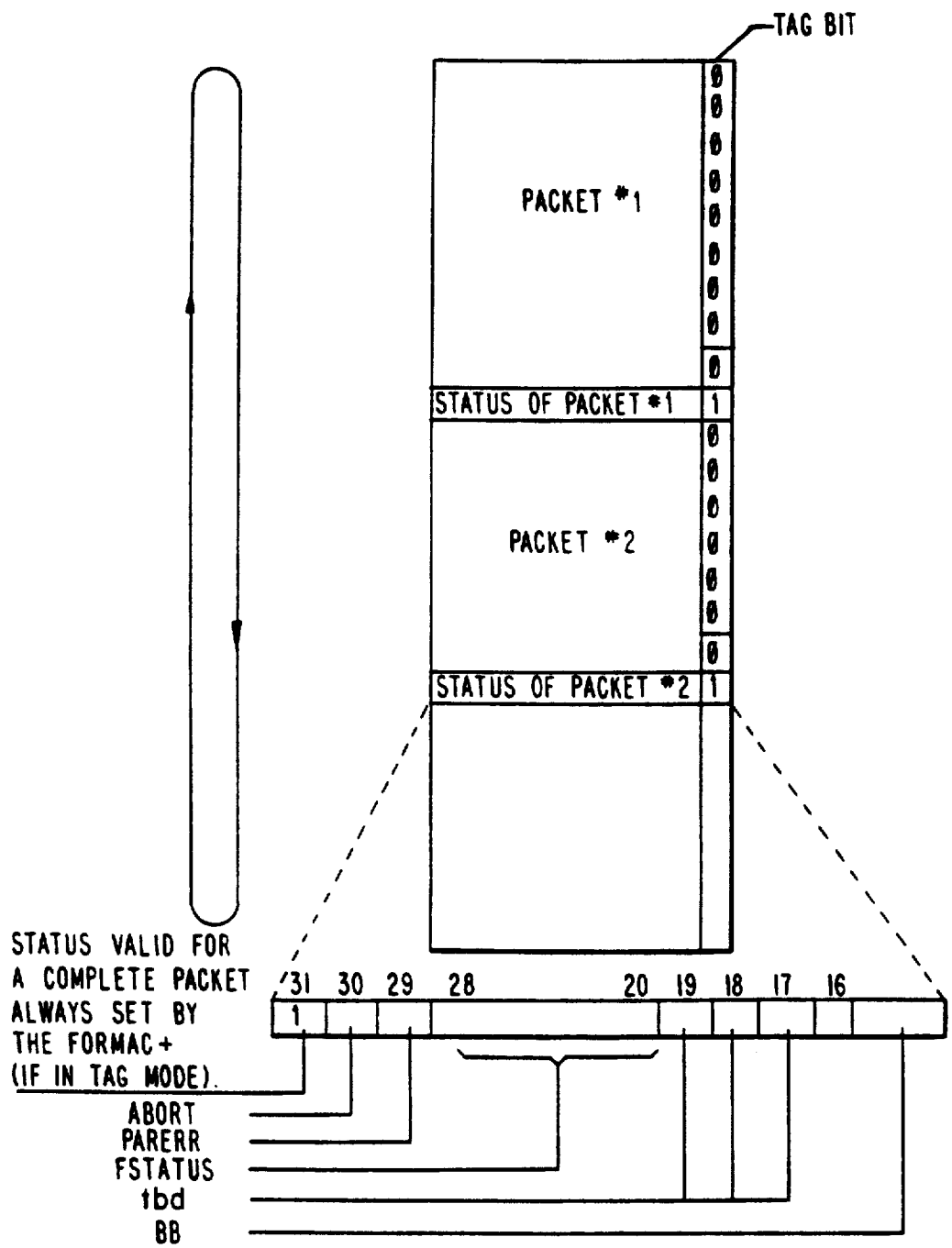
FIG. 16 shows the format of receive packets stored in the buffer memory.
Figure 11:
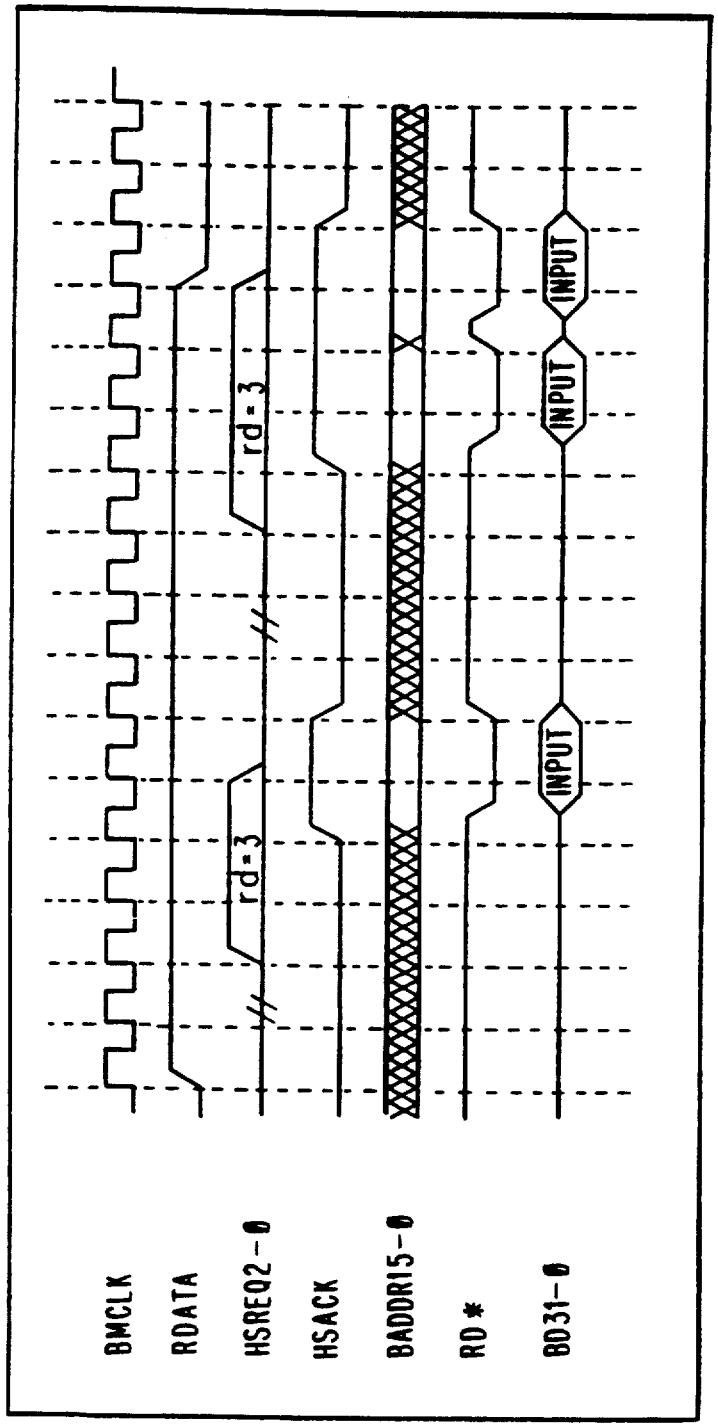

Packets received from the network stored in buffer memory 126 by the network access controller 120 are queued in the memory in the manner shown in FIG. 16. The receive packets in the buffer memory thus are stored contiguously one after the other, causing the buffer memory receive area to have the configuration of a circular queue. At the end of each packet, the network access controller 124 stores the status of the packet. The tag bit is set to 0 for data and to 1 to identify the status word.

Unloading of Receive Frames from Buffer Memory

The network access controller 124 signals the network DMA controller 126 to transfer data from the buffer memory 126 into the system memory. This takes place when the number of words in the buffer memory exceeds programmed threshold or contains a complete frame, as described in application (3), supra. Any overflow condition of the receive buffer queue during frame reception is indicated by the status word, indicating that the frame should be aborted.

Network Access and Network DMA Controller Interfacing

Figure 20:
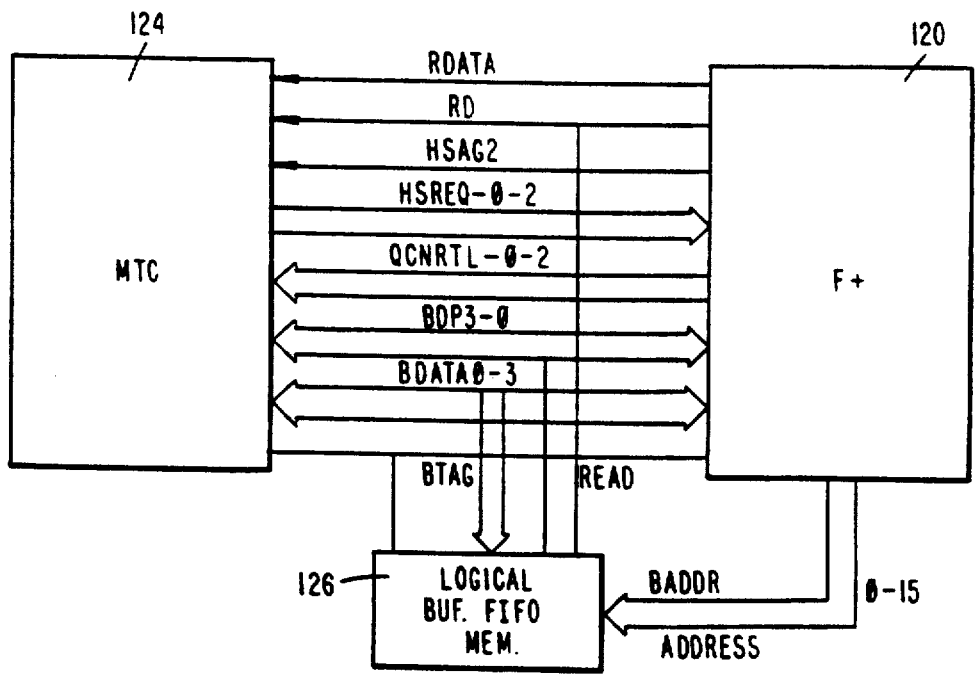
FIG. 20 is a diagram showing flow of signals among the network access controller, the network DMA controller and the buffer memory.
Figure 21:
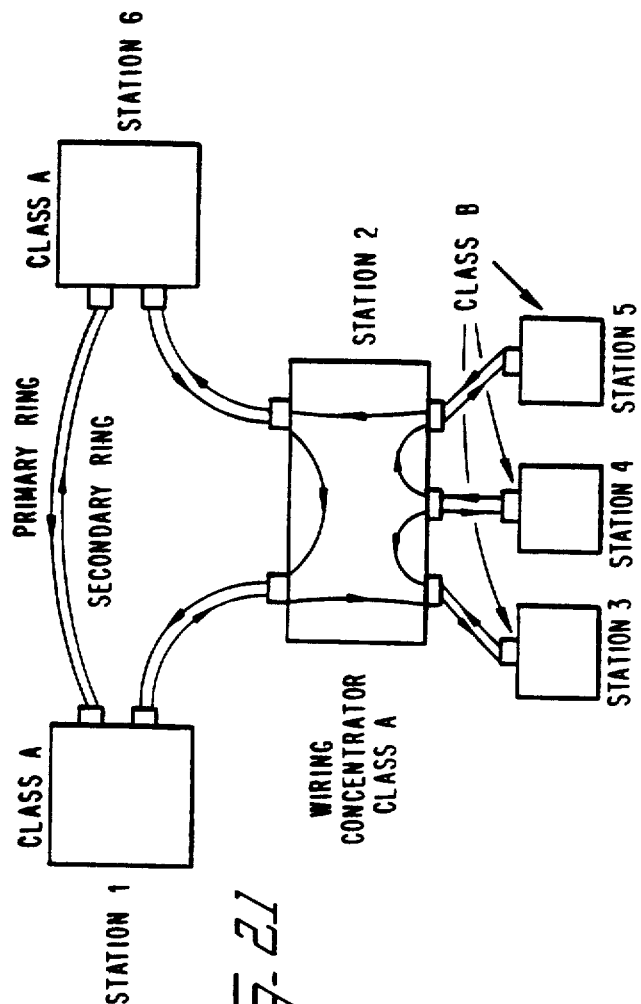
Figure 22:
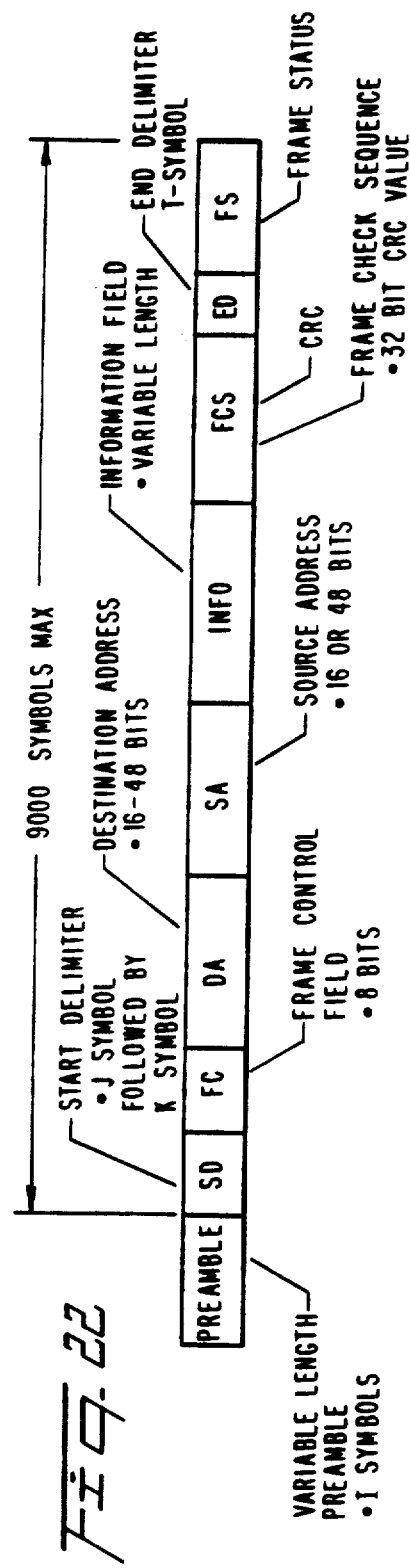
Figure 23:
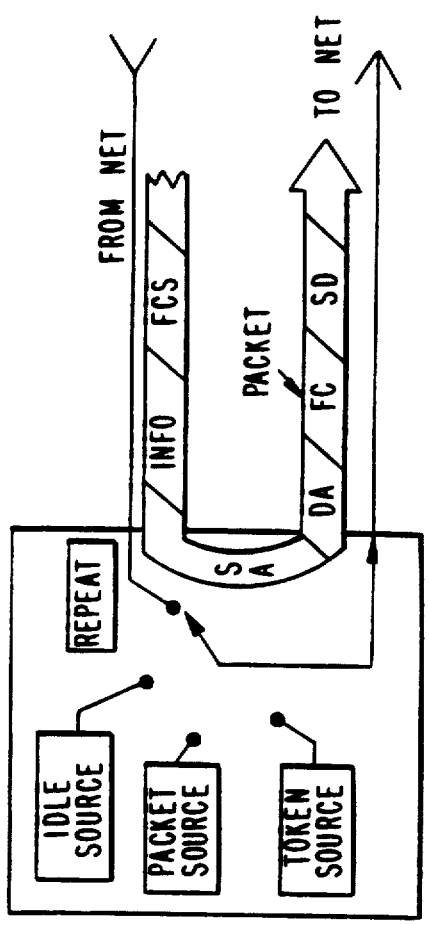
Figure 24:
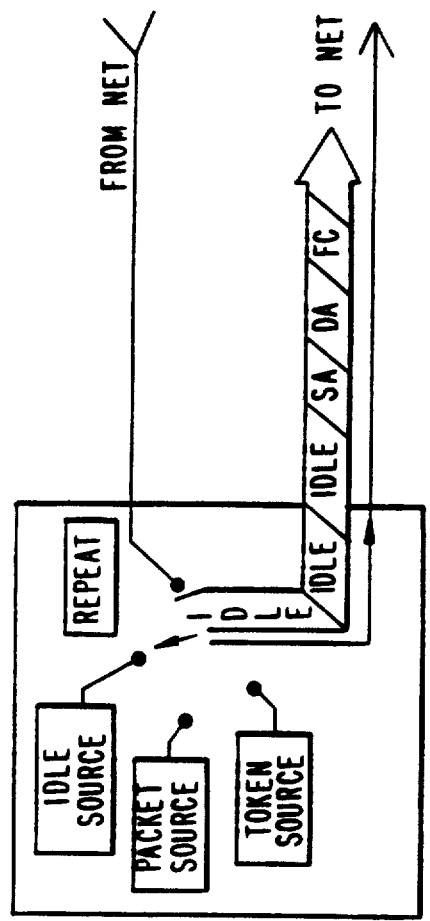

FIG. 20 shows the signal flow paths among network access controller 120, network DMA controller 124 and buffer memory 126. A buffer data bus BDATA, connected between network access controller 120 and network DMA controller 124 as well as to buffer 126 preferably is a 32 bit bus, and an additional line BTAG carries the tag bit defining whether the BD bus contains frame data or frame status, rather than data. The bus BDP carries buffer memory data parity bits for the BD bus and the BDTAG bus. All three of these buses, namely, BDATA, BTAG and BDP, are applied to buffer memory 126. Also applied to buffer memory 126 is an address bus BADDR that carries an address from the network access controller to the buffer memory 120.

Signals required for transmitting to the network are supplied by different queues, depending on priority as described in copending application (2) for "Transfer of Multiple Priority Inquiries Into Multiple Logical FIFOs Using a Single Physical FIFO" and application (4), for "Implementing Multiple Levels of Priorities in FDDI", supra, determined by the data on a control bus QCNTRL. The control bus QCNTRL also indicates to the network DMA controller 124 that the currently accessed transmit queue is "almost full", or that a queue that was previously full now is ready to accept additional data, in a manner described in copending application (2) for "Configuration of SRAMS as Logical FIFOs for Transmission and Reception of Packet Data", supra.

Also carried by the QCNTRL bus is data indicating transfer condition of data to any one of the queues, viz, the sync queue and the three levels of asynchronous queues, to transfer data to the medium. The transfer conditions provided by the network access controller 120 informs the network DMA controller 124 that controller 120 has the token and is currently transmitting that particular queue from buffer memory 126 to the medium. The network DMA controller 124 resumes transferring additional data from system memory to the buffer memory 126 for the corresponding transmit queue that was warned as being "almost full" by data previously on the QCNTRL bus.

A bus HSACK (host acknowledge) carries a signal indicating that a present network DMA controller write or read request is being granted by the network access controller 120. Together with this signal, buffer memory 126 is enabled, and data is present on BD (bus data), BDP (bus data priority) and BDTAG buses.

RDATA is asserted when the network access controller 120 receives data from the network, to be latched into the network DMA controller 124. In response, the network DMA controller requests access to the bus, which is acknowledged by the network access controller 120. RDATA accordingly functions as a write signal to the network DMA controller 124, transferring network data stored temporarily by the network access controller 120 in buffer memory 126, into the network DMA controller. The network access controller 120 stores network data in buffer memory 126 at the address specified by data on the BADDR bus, and the data stored in buffer thereafter is transferred to the network DMA controller 124, in response to an assertion by the network access controller 120 of the READ terminal of the buffer.

Referring to FIG. 17, timing of signals on the buses interfacing the network access controller 120, network DMA controller 124 and buffer 126 are synchronized to a buffer memory clock BMCLK signal shown therein, and RDATA is asserted to indicate that received data in buffer memory 126 is ready to be read by the network DMA controller 124. In response to RDATA, the network DMA controller 124 carries out a host request on the host request bus HSREQ, with the proper code, to request to the network access controller 120 to read data frames from the network. The network access controller 120 arbitrates the bus of the buffer memory 126 and provides an acknowledgement on HSACK. The network access controller also addresses buffer memory 126, pointing to the location where data resides, asserts a read command to the buffer and latches data from the buffer, on BDATA, to the memory DMA controller 124.

Thus, the network access controller 120 stores network data in frames into buffer memory 126, and when there is enough data therein, the controller 120 asserts RDATA to cause the network DMA controller 124 to fetch descriptors from the system memory to determine where in the system memory the network data is to be stored. When the buffer in the system memory, pointed to by the descriptor, becomes available, the DMA controller 124 supplies a host acknowledgement HSACK to the network access controller 120. The network access controller 120, in response, arbitrates, since it may already be occupied transmitting data to the network, or carrying out other functions. If the network access controller 120 is available, it supplies an acknowledgement (HSACK) back to the DMA controller 124, and then outputs a storage address, followed by a read command, to buffer 126. The data addressed in the buffer 126 is written to BDATA and is latched in the network DMA controller 124 to be supplied to the designated buffer in system memory, to complete the handshaking necessary for receiving data from the network.

Referring to FIG. 18, timing of signals on the buses during transmission of frames to the network assumes that the network DMA controller 124 has already accessed buffers in system memory, pointed to by descriptors, to be transmitted to the network. The data to be transmitted currently is stored in the on-chip FIFO 152, in FIG. 8(a), and is ready to transfer that data to the logical FIFO in buffer memory 126. In response to a host request to transmit data to the network, the network DMA controller supplies a host request signal HSREQ to the network access controller 120, indicating that the host requests a write to the network. The particular queue to which the host will write is determined by the code on the HSREQ bus. In the present example, it is assumed that the host requests to write to the sync queue, so that sync frames of data are supplied to the network. In response, the network access controller 120 arbitrates, and when time is available, it is responds with an acknowledgement signal to the host (HSACK). The network access controller 120 also supplies to buffer memory 126 the address therein where the frames of data to be transmitted to the network are temporarily stored, and supplies to a write pulse to the buffer. Data supplied by the network DMA controller 124 on the BDATA bus accordingly is written into the logical FIFO formed in buffer memory 126 at the location specified by the network access controller 120 on BDADDR.

If no more data is to be transmitted to the network, the network DMA controller 124 provides no further requests on HSREQ to the network access controller 120. If additional data is to be transmitted to the network, on the other hand, the HSREQ bus remains asserted, and when the network access controller 120 arbitrates that time is available, it supplies an additional address and write pulse to the buffer 126 after acknowledging to the controller 124 on HSACK.

Figure 19:
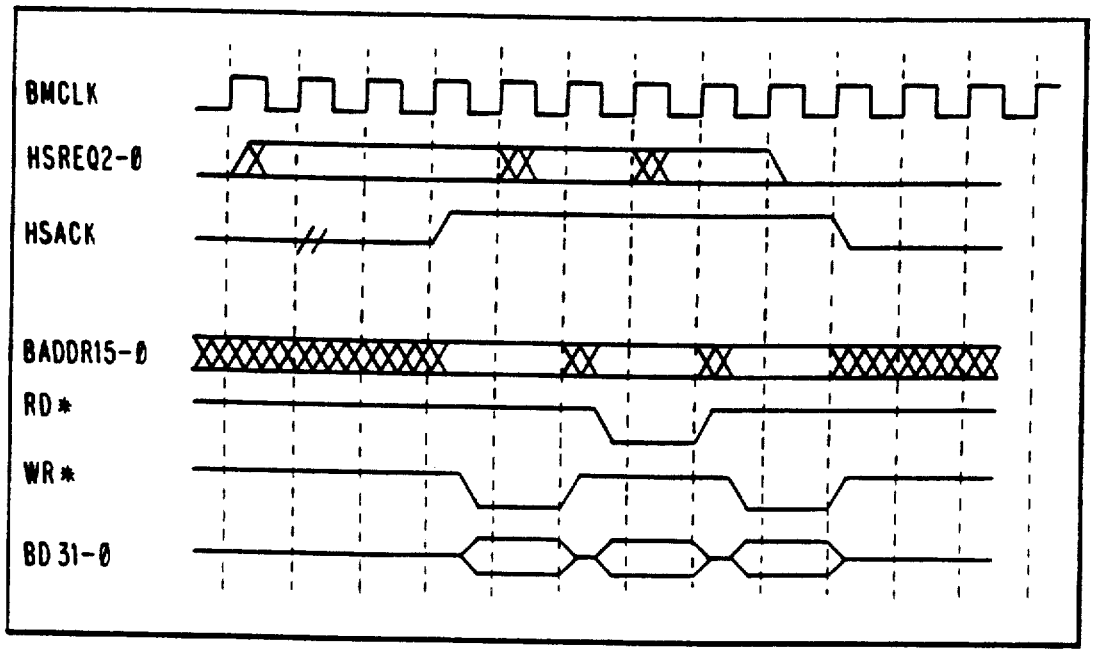
FIG. 19 is a timing diagram showing back-to-back read and write by the buffer memory.

FIG. 19 shows the timing relationships of data on the buses during back-to-back read and write operations. In the example shown, the network access controller 120 initially is busy carrying out a write, then carries out a read operation and then returns to a write operation. The signals supplied to the various buses involved correspond in succession to those shown in FIGS. 17 and 18.

There has accordingly been described a bus master architecture having particular utility in, but not limited to an FDDI network wherein the configuration of the architecture is the same both for low system bus latency and high system bus latency application. This is carried out in part by the unique buffer incorporated therein combining physical (on-chip) and logical (external) FIFOs as needed to store system and network data as needed depending on bus latency and other bus characteristic. Thus for low bus latency applications, FIFOs may be incorporated solely on the physical FIFO so that no external FIFO is needed. On the other hand, for high bus latency applications, the amount of additional FIFO needed is implemented by an external SRAM configured to have receive and transmit FIFOs to carry out the read and write operations required by FDDI specifications.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

APPENDIX I—LAN CHARACTERISTICS

Characterizing any local area network are (1) physical medium and transmission technique, (2) topology, i.e., the logical arrangement of its stations, (3) access, i.e., how the network arbitrates among its stations for use of the shared medium and (4) protocol.

There currently are three different types of media, namely, twisted copper wire which is inexpensive but susceptible to noise and limited to relatively low data transmission rates and distances, coaxial cable which retains to a degree the limitations of twisted copper wire, and optical fiber. The maximum bandwidth currently available in metallic media, i.e., wire and cable, is on the order of up to 10 megabits per second. The bandwidth available in optical media is an order of magnitude greater.

The basic LAN topologies are linear bus, ring and star. In a linear bus topology, stations are arranged along a single length of cable that can be extended at one of the ends. A complex linear bus in which the cable branches at either or both ends, but which offers only one transmission path between any two stations, is termed a tree. In a ring topology, stations are arranged along the transmission path so that a signal passes through one station at a time before returning to its original station; the stations form a closed circle. A ring network in which one master station controls transmissions is termed a loop. A star network has a central node that connects to each station by a single, point-to-point link. Any communication between one station and another must pass through the central node.

The access method of a network is the technique by which the network distributes the right to transmit among its participating stations. In general, access control is centralized or distributed. Most LANs use distributed access methods in which each station participates equally in controlling the network.

There are two general classes of distributed access, namely, random, or "contention," and deterministic. With a random access method, any station has the capability to initiate a transmission at any time. With a deterministic access method, each station must wait its turn to transmit. An example of a random access method is "carrier sense multiple access" (CSMA), wherein all stations have the capability to sense traffic on the network. When each station wishes to transmit, it "listens"

on the main data channel for the sort of electrical activity it recognizes as traffic. If a station senses traffic, it defers its transmission for a random interval and then resumes listening. When the station senses no traffic on the channel, it transmits.

The most widely used deterministic access method is "token-passing". In a token-passing network, stations distribute the right to transmit on the channel by circulating a "token", which is a special bit pattern that assigns the right to transmit to the station that receives it. A station that wishes to transmit waits until it receives the token from the previous station in the token-passing order. When the station receives the token, it transmits its data, then passes the token to the next station. In this regard, token passing is a form of distributed polling wherein each station on the network polls the next station in line for its transmission.

The design of most local area networks is based on the reference model for open systems integration (OSI) proposed by the International Organization for Standardization (IOS) that in 1977 established a subcommittee to develop a framework for defining standards for linking heterogenous computers. OSI has adopted a structuring techniques known as "layering", wherein communications functions are partitioned into a vertical set of layers. Each layer performs a related subset of functions required to communicate with another system, relying on the next lower layer to perform more primitive functions and providing services to the next higher layer. The resulting OSI reference model has seven layers wherein corresponding "peer" layers in two systems communicate with each other by a protocol having particular syntax, semantics and timing.

For example, layer 1 in the ISO is the physical layer that pertains to the physical and electrical characteristics of the transmission medium. Layer 2 is the data link layer which links access management, such as transmission setup, address recognition, message acknowledgement and basic error checking. Appendix II herein shows how these layers are implemented in an FDDI network.

APPENDIX II—FDDI OVERVIEW

In FDDI, the lowest layer of the OSI model, the physical layer, contains two sublayers. The lower sublayer is a physical medium dependent sublayer (PMD) which defines the wavelength for optical transmission, the fiber-optic connector employed, the function of the optical receive and details on an optional optical bypass switch that can be incorporated within a station. The upper layer, or physical sublayer (PHY), defines a 4B/5B group encoding scheme used to represent data and control symbols on the network. The PHY sublayer also describes retiming transmission within the network.

The data link layer in the OSI model is also subdivided into two sublayers. The lower sublayer is termed "media access control" (MAC), which defines the token-passing protocol for controlling transmission on the network. Packet formation, addressing and cyclic redundancy checking are all specified in MAC. The upper sublayer, termed "link layer control" (LLC), is not specified by the FDDI standard. The final element in the FDDI standards, namely, station management (SMT) also falls outside the scope of the OSI model. It provides the intelligence that allows cohesive operation of the individual sublayers in an FDDI node, defining error detection and fault isolation algorithms.

FIG. A-1 is a simplified block diagram of an FDDI ring composed of a variety of station types. Class A stations, sometimes referred to as "dual attachment stations", are connected to both the primary and secondary rings of the network. Data flows in opposite directions on the two rings as indicated by the arrows. The class A station can act as a wiring concentrator, serving to interconnect several single-attachment, or class B, stations to the ring. Station 2 is a wiring concentrator for stations 3, 4 and 5; concentrators provide the network administrator with a single maintenance point for a large number of stations.

The MAC sublayer controls the flow of data transmission on the ring. Data transmission with the proper protocol characters required to form an FDDI packet are encapsulated by the MAC.

The format for an FDDI packet is shown in FIG. A-2. Packets are preceded by a minimum of 16 idle control symbols (preamble). Packets begin with a start delimiter (SD) composed from the J and K control symbols of the number 4B/5B code well known in the art. This is followed by a two-data-symbol frame control (FC) field that identifies the type of packet. The destination address (DA) identifies the intended recipient of the packet. Likewise, the source address (SA) identifies the sender of the packet. Addresses can be either 16 or 48 bits in length. The DA field can point to a single station, a group of stations or all stations on the ring.

Following SA comes the variable length information field. The frame check sequence (FCS) field contains 4 bytes of data. These data are the result of a 32 bit Autodin II cyclic redundancy check polynomial. The FCS ensures the data integrity of the FC, DA, SA, info and FCS fields.

Following the FCS field, an end delimiter (ED) formed with the T symbol is transmitted. The frame status (FS) field is used for symbols that determine whether the packet was received with error, if the address was recognized, or whether the packet was copied. The maximum length of the packet is limited by the size of the elasticity buffer in the PHY sublayer and the worst case frequency difference between the two nodes.

The MAC sublayer acts like a "switch" shown in FIGS. A-3(a) and A-3(b). Normally, the switch selects a source of IDLE control symbols for transmission on the ring. When a start delimiter arrives, MAC switches to a repeat path. The packet is monitored, copied if required, and simultaneously repeated. MAC can also switch to source its own packets or issue a token.

Packets are removed from the FDDI by the originating station. This process is called "stripping", shown in FIGS. A-3(a) and A-3(b). MAC repeats the packet until the SA field is received. Upon recognition of the source address, the switch moves to the IDLE position. The resulting packet fragment on the ring is ignored and eventually removed when it reaches a station holding the token for transmission.

An FDDI station awaiting to transmit must first "capture" a token which is a 6-symbol packet that is uniquely recognized. A station captures the token by performing the stripping action. Only the token SD field is repeated on the ring. Once the token is captured, the station can begin transmitting packets. When the last packet is sent, the station immediately follows by issuing a new token.

The rules for capturing the token and the amount of time allotted for data transmission are governed by the "timed token protocol" defined in the FDDI specifications. The protocol was designed to guarantee a maximum token rotation time, decided in a bidding process among stations on initialization. The bidding process allows the station requiring the fastest time between token arrivals to dictate the token rotation time for the ring.

The timed token protocol offers two types of transmission service, namely, synchronous service and asynchronous service. Stations are given a predefined amount of transmission bandwidth on each token rotation with the synchronous service. The remaining ring bandwidth is shared among stations using the asynchronous service. Stations are allowed to send asynchronous transmission when the token service arrives earlier than expected. The amount of time alloted for the asynchronous transmission is limited to the difference between the actual time of arrival by the token and the expected time of token arrival. The allotment of bandwidth for asynchronous transmission is dynamic, with any unused bandwidth for synchronous transmission being automatically reallocated for asynchronous transmission on a token rotation.

Error detection and recovery methods occur at various levels within the FDDI structure. PMD can recognize the loss of optical carrier, PHY can recognize a noisy or quiet line and lost token and invalid packers are discovered by the MAC sublayer. Station management algorithms detect these conditions and respond in a proper manner.

What is claimed is:

1. In a network comprising a processor and a system memory coupled by a system bus, a network interface for interfacing the system bus to a network containing other processors and system memories, wherein the system bus has an average system bus latency, the network interface, comprising:
   a network access controller means for accessing data on said network;
   a random access memory;
   said network access controller means including means for determining the average system bus latency, and means responsive to said determined average system bus latency for assigning locations inside said random access memory to have at least one logical FIFO for storing data, the size of said logical FIFO being related to said determined average system bus latency; and
   network DMA controller means coupled to said at least one logical FIFO for controlling transfer of data between said system memory and said at least one logical FIFO.

2. The interface of claim 1, wherein said random access memory means is comprised of a first static random access memory (SRAM).

3. The interface of claim 2, wherein said first static random access memory comprises a second SRAM external to said network access controller means and said network DMA controller means.

4. The interface of claim 2, wherein said first static random access memory comprises a second SRAM on a common chip with at least one of said network access controller means and said network DMA controller means.

5. The interface of claim 1, wherein at least one of said network controller means and said network DMA controller means includes an on-chip FIFO to compensate for mismatches between system bus and network clock rates.

6. The interface of claim 1, wherein said network access controller means includes means for assigning locations inside said random access memory to have (1) a first logical FIFO for storing data incoming from said network access controller means to said DMA controller means and (2) at least one additional logical FIFO for storing data outgoing from said DMA controller means to said network access controller means.

7. The interface of claim 6, wherein said DMA controller means includes means for formatting data packets stored in said system memory into frames to be transmitted on said network bus and for storing said frames in said first logical FIFO sequentially and contiguously to form at least one queue.

8. The interface of claim 7, wherein said network access controller means includes means responsive to a request for transmission for reading a number of said frames in sequence from said first logical FIFO and for transmitting said number of frames on said network.

9. The interface of claim 7, wherein said network access controller means includes means for receiving frames of data on said network and for storing said frames sequentially in said at least one additional logical FIFO to form at least one queue.

10. The interface of claim 9, wherein said DMA controller means includes means for reading said at least one queue of data frames in said at least one additional logical FIFO and for transmitting said data frames to said system memory.

11. The interface of claim 7, wherein boundaries between frames are demarked by tag bits.

12. The interface of claim 7, wherein status bits are appended to each frame.

13. The interface of claim 1, wherein one of said controller means is located on a chip and said at least one logical FIFO comprises a first memory region located on said chip and a second memory region external to said chip.

14. The interface of claim 13, wherein each of said first and second memory regions comprises at least one FIFO section.

15. The interface of claim 13, wherein said network DMA controller means comprises said first memory region.

16. The interface of claim 15, wherein said first memory region comprises a transmit section for storing data to be transmitted in said second memory region arranged in queues having predetermined priorities.

17. In a system comprising a processor and a system memory coupled by a system bus, a method being performed by a network access controller for interfacing said system bus to a network containing other processors and system memories, wherein the system bus has an average system bus latency, comprising the steps of:
   accessing data on said network;
   determining the average system bus latency and in response to said determined average system bus latency assigning locations inside a random access memory to have at least one logical FIFO for storing data, the size of said logical FIFO being related to said determined average system bus latency; and
   controlling transfer of data between said system memory and said network through said at least one logical FIFO.

18. The method of claim 17, wherein said step of assigning includes the steps of assigning locations inside said random access memory to have (1) a first logical FIFO for storing incoming data from said network and (2) at least one additional logical FIFO for storing outgoing data from said system memory to said network.

19. The method of claim 17, wherein said step of assigning includes the steps of assigning locations inside said random access memory to have (1) a first memory region located on a chip for interfacing said system bus to said network and (2) a second memory region external to said chip.

20. The method of claim 19, wherein said step of controlling transfer of data includes the step of controlling the first memory region to transmit into the second memory region data arranged in queues having predetermined priorities.

21. The method of claim 20, wherein said step of controlling first memory region includes the step of switching the queues when a predetermined location of said second memory region is filled up with data.

22. For a Fiber Distributed Digital Interface (FDDI) network having a plurality of processors each having a system memory and being coupled by a system bus having an average system bus latency to an optical medium forming a digital data communication path among said processors, a network controller, comprising:

first means implementing a time token data protocol for accessing said optical medium;
a random access memory means;
second means for determining said average system bus latency and in response to said determined average system bus latency for assigning locations inside said random access memory means to have at least one logical FIFO for storing packet data, the size of said logical FIFO being related to said determined average system bus latency; and
third means responsive to said first means for controlling transfer of data between said system memory and said at least one logical FIFO.

23. The network controller of claim 22, wherein said random access memory means is comprised of a first static random access memory (SRAM).

24. The network controller of claim 23, wherein said first static random access memory comprises a second SRAM external to said first, second and third means.

25. The network controller of claim 23, wherein said first static random access memory means comprises a second SRAM on a common chip with at least one of (a) said first and second means and (b) said third means.

26. The controller of claim 22, wherein at least one of (1) said first and second means and (2) said third means includes an on-chip FIFO to compensate for mismatches between system bus and optical medium clock rates.

27. The controller of claim 22, wherein said second means includes means for assigning locations inside said random access memory to have (1) a first logical FIFO for storing data incoming from said third means to said first means and (2) at least one additional logical FIFO for storing data outgoing from said first and second means to said third means.

28. The controller of claim 27, wherein said second means includes means for formatting data packets stored in said system memory into frames to be transmitted on said optical medium and for storing said frames in said first logical FIFO sequentially and contiguously to form at least one queue.

29. The controller of claim 28, wherein said first means includes means responsive to a request for transmission for reading a number of said frames in sequence from said first logical FIFO and for transmitting said number of frames on said optical medium.

30. The controller of claim 28, wherein said first and second means includes means for receiving frames of data on said optical medium and includes means for storing said frames sequentially in said at least one additional logical FIFO to form a queue.

31. The controller of claim 28, wherein said third means includes means for reading said queue of data frames in said at least one additional logical FIFO and for transmitting said data frames to said system memory.

32. The controller of claim 28, wherein boundaries between frames are demarked by tag bits.

33. The controller of claim 28, wherein status bits are appended to each frame.

34. The network controller of claim 22, wherein one of said first, second and third means is located on a chip and said logical FIFO comprises a first memory region located on said chip and a second memory region external to said chip.

35. The network controller of claim 34, wherein each of said first and second memory regions is a FIFO memory.

36. The network controller of claim 35, wherein said third means comprises said first memory region.

37. The network controller of claim 36, wherein said first memory region comprises a receive section for storing data received from said second memory region, said receive section sends the received data into said system memory in a predetermined order.

38. The network controller of claim 37, wherein said third means comprises pointing means for setting said predetermined order to send different types of the packet data into corresponding locations in said system memory.

39. The network controller of claim 38, wherein said pointing means comprises a plurality of descriptor rings programmable to receive different types of the packet data based on an FDDI protocol.

40. The method of claim 34, wherein each of said first and second memory regions is managed in a FIFO manner.

41. For a Fiber Distributed Digital Interface (FDDI) network having a plurality of processors each having a system memory and being coupled by a system bus having an average system bus latency to an optical medium forming a digital data communication path carrying data packets among said processors and memories, a method being performed by a network access controller for interfacing said system bus and said optical medium, comprising the steps of:

accessing said optical medium in response to predetermined conditions;
determining said average system bus latency and in response to said determined average system bus latency assigning locations inside said random access memory means to have at least one logical FIFO for storing packet data, the size of said logical FIFO being related to said determined average system bus latency; and
controlling transfer of data between said system memory and said optical medium through said at least one logical FIFO.

42. The method of claim 41, wherein said step of assigning includes the steps of assigning locations inside said random access memory to have (1) a first logical FIFO for storing incoming data from said optical medium and (2) at least one additional logical FIFO for storing outgoing data from said system memory to said optical medium.

43. The method of claim 41, wherein said step of assigning includes the steps of assigning locations inside said random access memory to have (1) a first memory region located on a chip for interfacing said system bus and said optical medium and (2) at a second memory region external to said chip.

44. The method of claim 43, wherein each of said first and second memory regions is managed in a FIFO manner.

45. The method of claim 43, wherein said step of controlling transfer of data comprises the step of controlling the first memory region to retransmit data received from the second memory region to the system memory in a predetermined order based on an FDDI protocol.

46. The method of claim 45, wherein said step of controlling the first memory region comprises the step of pointing a location inside the system memory for storing a particular type of the data packets.

* * * * *